US012595179B2

(12) United States Patent
Yan et al.

(10) Patent No.: US 12,595,179 B2
(45) Date of Patent: Apr. 7, 2026

(54) SYNTHESIS OF UNIFORM DIAMOND NANOPARTICLES

(71) Applicant: University of North Texas, Denton, TX (US)

(72) Inventors: Hao Yan, Denton, TX (US); Tengteng Lyu, Denton, TX (US)

(73) Assignee: University of North Texas, Denton, TX (US)

( * ) Notice: Subject to any disclaimer, the term of this patent is extended or adjusted under 35 U.S.C. 154(b) by 631 days.

(21) Appl. No.: 18/057,028

(22) Filed: Nov. 18, 2022

(65) Prior Publication Data

US 2023/0159337 A1 May 25, 2023

Related U.S. Application Data

(60) Provisional application No. 63/281,410, filed on Nov. 19, 2021.

(51) Int. Cl.

| | |
|---|---|
| ***C01B 32/00*** | (2017.01) |
| ***C01B 32/26*** | (2017.01) |
| ***C01B 32/28*** | (2017.01) |

(52) U.S. Cl.

CPC .............. *C01B 32/26* (2017.08); *C01B 32/28* (2017.08); *C01P 2004/64* (2013.01)

(58) Field of Classification Search

None

See application file for complete search history.

(56) References Cited

U.S. PATENT DOCUMENTS

| | | | |
|---|---|---|---|
| 9,079,295 B2 | 7/2015 | Chakraborty et al. | |
| 9,776,151 B2 | 10/2017 | Chakraborty et al. | |
| 10,240,251 B2 | 3/2019 | Narayan | |
| 10,287,495 B1 * | 5/2019 | Shenderova | A61K 47/02 |
| 10,906,016 B2 | 2/2021 | Spitzer et al. | |
| 11,105,811 B2 | 8/2021 | Cao et al. | |

FOREIGN PATENT DOCUMENTS

| | | |
|---|---|---|
| WO | 02086180 A2 | 10/2002 |
| WO | 2009094481 A2 | 7/2009 |

OTHER PUBLICATIONS

Arguelles-Pesqueira et al., Low intensity sonosynthesis of iron carbide@iron oxide core-shell nanoparticles, Ultrasonics-sonochemistry, 49, pp. 303-309 (Year: 2018).*

Andrich et al., "Long-Range Spin Wave Mediated Control of Defect Qubits in Nanodiamonds," npj Quantum Information, 3(28):2-7, Jul. 2017.

(Continued)

*Primary Examiner* — Stefanie J Cohen

(74) *Attorney, Agent, or Firm* — Haukaas Fortius PLLC; Michael Haukaas; Raymond F. Horvath

(57) ABSTRACT

The synthesis of sub-five-nanometer nanodiamonds with high uniformity and purity. Inspired by the formation of natural diamond, iron carbide nanoparticles embedded in iron oxide matrices as the carbon source were used. High-pressure-high-temperature treatment of the precursor yields nanodiamonds with tunable diameters down to 2.13 nm and 0.22-nm standard deviation. The disclosed synthesis procedures also include a method for forming fluorescent nanodiamonds.

20 Claims, 15 Drawing Sheets

(56) References Cited

OTHER PUBLICATIONS

Anzolini et al., "Evidence for Complex Iron Oxides in the Deep Mantle From FeNi(Cu) Inclusions in Superdeep Diamond," PNAS USA, 117(35);21088-21094, Sep. 2020.
Barnard, "Diamond Standard in Diagnostics: Nanodiamond Biolabels Make Their Mark," Analyst, 134:1751-1764, Sep. 2009.
Bataleva et al., "Conditions for Diamond and Graphite Formation from Iron Carbide at the P-T Parameters of ithospheric Mantle," Russ. Geol. Geophys., 57(1):176-189, Jan. 2016.
Chauhan et al., "Nanodiamonds with powerful ability for drug delivery and biomedical applications: Recent updates on in vivo study and patents", Journal of Pharmaceutical Analysis 10 (2020), pp. 1-12.
Dischler, Bernhard., "Impurity Defects in Diamond", Handbook of Spectral Lines in Diamond, Chapter 9, pp. 303-367, Jan. 1, 2012.
Fraczek et al., "Laser spectroscopy of NV- and NV0 colour centres in synthetic diamond", Opt. Mater. Express 7, Jul. 1, 2017, 15pgs.
Kayani et al., "Synthesis of Iron Oxide Nanoparticles by Sol-Gel Technique and Their Characterization," IEEE Transactions on Magnetics, 50(8):2200404, Aug. 2014.
Lattauada et al., "Functionalization of Monodisperse Magnetic Nanoparticles," Langmuir, 23(4):2158-2168, Dec. 2006.
Nunn et al., "Nanodiamond: A High Impact Nanomaterial," Curr Opin Solid State Mater Sci., 21(1):1-9, Feb. 2017.
Palyanov et al., "Mantle-Slab Interaction and Redox Mechanism of Diamond Formation," PNAS USA, 110(51):20408-10413, Dec. 2013.
Serovaiskii et al., "Fate of Hydrocarbons in Iron-Bearing Mineral Environments during Subduction," Minerals, 9(11):651, Oct. 2019.
Sque et al., "Hydrogenation and oxygenation of the (100) diamond surface and the consequences for transfer doping", Phys. Stat. Sol. (a) 202, Aug. 3, 2005, No. 11, pp. 20991-2097.
Stan et al., "X-Ray Diffraction under Extreme Conditions at the Advanced Light Source," Quantum Beam Sci., 2(4):1-33, Jan. 2018.
Stehlik et al., "High-Yield Fabrication and Properties of 1.4nm Nanodiamonds With Narrow Size Distribution," Sci Rep., 6(38419):1-8, Dec. 2016.
Stehlik et al., "Size and Purity Control of HPHT Nanodiamonds down to 1 Nm," J. Phys. Chem., 119(49):27708- 27720, Aug. 2015.
Tzeng et al., "Vertical-Substrate MPCVD Epitaxial Nano-diamond Growth," Nano Lett., 17(3):1489-1495, Feb. 2017.
Vlasov et al., "Nitrogen and Luminescent Nitrogen-Vacancy Defects in Detonation Nanodiamond", Small, Mar. 8, 2010, 6(5):687-94.
Yang et al., "Modulating the Phases of Iron Carbide Nanoparticles: From a Perspective of Interfering the Carbon Penetration of Fe@Fe3O4 by Selectively Absorbed Halide Ions," Chem. Sci., 8:473-481, 2017.

* cited by examiner (a)

Controlled incorporation of hetereo-atoms for doping nanodiamond

Dopants

FeNP     Fe₂CNP

Iron carbide nanoparticles (Fe₂CNP) with controlled sizes (5-15 nm)

Fe₂O₃

Synthesis of iron carbide embedded in iron oxide matrix (Fe₂C@Fe₂O₃)

FeO    ND

HPHT conversion of Fe₂C@Fe₂O₃ into nanodiamond

SYNTHESIS OF UNIFORM DIAMOND NANOPARTICLES

RELATED APPLICATIONS

This application claims priority under 35 U.S.C. § 119(e) to U.S. Provisional Patent Application No. 63/281,410, filed Nov. 19, 2021, which is incorporated herein by reference.

BACKGROUND OF THE INVENTION

Control of diamond clusters with nanometer precision presents a crucial yet uniquely challenging task in nanoscience. Nanodiamonds (NDs) with uniform 1-5 nm diameters are essential to a variety of applications. As drug delivery vehicles, NDs with <6-nm diameter are effectively retained in tumors and readily removed from normal tissues, while larger NDs show substantial accumulation in human bodies. As intracellular fluorescent probes, NDs with sub-5-nm diameters provide high efficiency of internalization, minimal disruption of cellular activities and high spatial resolution. Finally, size confinement in the ~2 nm regime provides a promising route to create single color centers in diamond, a key building block for single-photon sources, spin sensors and quantum bits.

However, direct synthetic control of ND sizes in the sub-5-nm range remains and outstanding challenge. Diamond growth involves high pressure, high temperature and/or far-from-equilibrium conditions, rendering conventional tools for colloidal size control unavailable. Several strategies for the synthesis of NDs have been developed. In plasma-enhanced chemical vapor deposition (PECVD), decomposition of methane in argon atmosphere yields surface-bound ultra-nanocrystalline diamond (UNCD) with 2-5 nm diameter. These UNCD films are however covered by a graphitic layer, hampering their optical and spin properties. Detonation is by far the most popular method for ND production. Although the as-synthesized detonation nanodiamonds (DNDs) have large diameter variations, post-synthetic oxidation can reduce the average size and standard deviation of ND diameters to 1.4 and 0.7 nm, respectively. However, DNDs are characterized by high graphitic content and unintentional incorporation of heteroatoms, hindering precise control of their chemical compositions.

Synthesis of NDs by high-pressure-high-temperature (HPHT) treatment of organic precursors has gained renewed momentum in recent years. Unlike PECVD and detonation, in HPHT NDs are formed quasi-statically under thermodynamically favorable conditions, resulting in high crystallinity and low defect density. This approach yields a broad range of sizes from a few to several hundred nanometers. Centrifugation combined with chemical modification is needed to isolate the faction of ultrasmall NDs.

An outstanding challenge remains despite many efforts for the direct synthesis of nanodiamonds with precise control of diameter. To this end, direct HPHT synthesis of NDs with uniform and tunable sizes is highly desired.

SUMMARY

Inspiration for this technology was drawn from the natural formation of diamond in Earth's upper mantle which presents a high-pressure (over 10 GPa), high-temperature (up to 1800 K) and iron-rich environment. Here carbonaceous compounds (carbides and carbonates, etc.) undergo complex redox reactions with iron species to form diamond. A reaction between iron carbide and iron oxide was utilized which had been experimentally demonstrated (Russ. Geol. Geophys. 2016, 57 (1), 176):

$$Fe_2C + 2Fe_2O_3 \xrightarrow{HPHT} 6FeO + C_{diamond} \quad \text{Eq. 1}$$

To implement this reaction, a composite precursor consisting of uniform $Fe_2C$ nanoparticles (NPs) (Chem. Sci. 2016, 8 (1), 473) embedded in $Fe_2O_3$ matrices was synthesized (FIG. 1*a*). The $Fe_2C$ NP size determines the amount of carbon available for diamond formation, thereby controlling the size of the NDs through a self-limiting mechanism.

This new synthetic method produces highly crystalline diamond nanoparticles with uniform and tunable diameter in the sub-5-nm regime and allows the nanodiamonds to be synthesized with non-carbon atoms (N, Si, Ge, Sn, etc. for optical and magnetic functionalities) that enables imaging and quantum information applications.

Accordingly, this disclosure provides a composition comprising nanodiamond particles wherein:

a) each nanodiamond particle is encapsulated by a transition metal oxide layer; and b) each nanodiamond particle has a diameter of about 1 nm to about 5 nm; wherein the diameters the nanodiamond particles of the composition vary by ±0.3 nm or less.

This disclosure also provides a colloidal gel comprising iron carbide ($Fe_2C$) nanoparticles and iron(III) nitrate ($Fe(NO_3)_3$) in a $Fe_2C$:$Fe(NO_3)_3$ molar ratio of about 1:1 to about 1:6, and an organic acid;

wherein the $Fe_2C$ nanoparticles have a diameter of about 5 nm to about 15 nm, the diameter of each of the particles varies by ±1.5 nm or less, and the $Fe_2C$ nanoparticles are uniformly distributed in the $Fe(NO_3)_3$.

Additionally, this disclosure provides a method for uniformly sized nanodiamond particles comprising:

a) inverting the polarity of hydrophobic iron carbide nanoparticles to hydrophilic iron carbide nanoparticles;

b) dispersing the hydrophilic nanoparticles in a pH neutral solution of iron(III) nitrate ($Fe(NO_3)_3$) to form a mixture;

c) heating the mixture to form a colloidal gel described above;

d) calcining the colloidal gel in the presence of oxygen to form a composite of iron carbide ($Fe_2C$) nanoparticles that are uniformly distributed in iron(III) oxide ($Fe_2O_3$); and e) applying a high pressure and high temperature (HPHT) to the composite suitable for forming uniformly sized nanodiamond particles having a diameter of 5 nm or less.

In some embodiments, the above method further comprises i) adding silica colloidal particles to the mixture; ii) removing silica from the composite with an alkaline solution to form a mesoporous composite; and iii) annealing the mesoporous composite in ammonia prior to applying HPHT; wherein the uniformly sized nanodiamond particles comprise fluorescent nitrogen vacancies.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
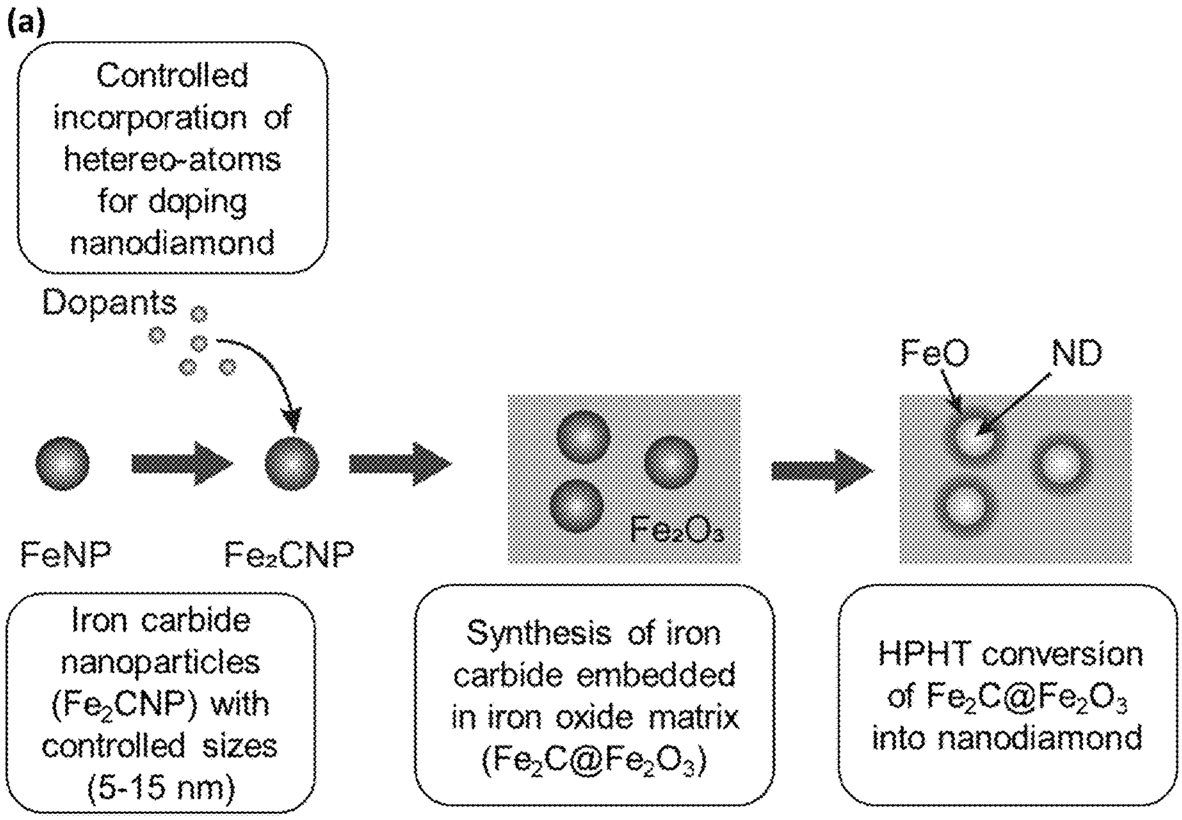
FIG. 1. Synthesis of ND. (a) Schematic of the HPHT synthesis. (b) Low-magnification Transmission electron microscopy (TEM) of NDs. White dashed circles serve as eye guides for NDs. Scale bar, 10 nm. (c) EDS from the HPHT product (top trace) and a blank region on the TEM grid (bottom trace). (d-e) High-resolution TEM images of two NDs showing (110) (d) and (100) (e) lattice fringes. Scale bars, 1 nm. (f) XPS at C-1s edge of the HPHT product. Open circles represent experimental data. Lines represent the overall fit and three components arising from C—C, C—O and C═O species, respectively. (g) Raman spectrum of the HPHT product in the C—C stretching region. (h) Histogram of ND diameter distribution. Curve denotes Gaussian fit of the distribution function. Inset, TEM image used for ND size analysis. Scale bar, 10 nm. (i) Mean and standard deviation of ND diameters from this work (star) and literature. Symbols show NDs from detonation and HPHT. Solid and open symbols denote as-synthesized and post-synthetic-treated NDs. Triangle, square and circle denote ND sizes measured by atomic-force microscopy, dynamic light scattering and TEM, respectively. The reference numbers are given under each data point.
Figure 1:
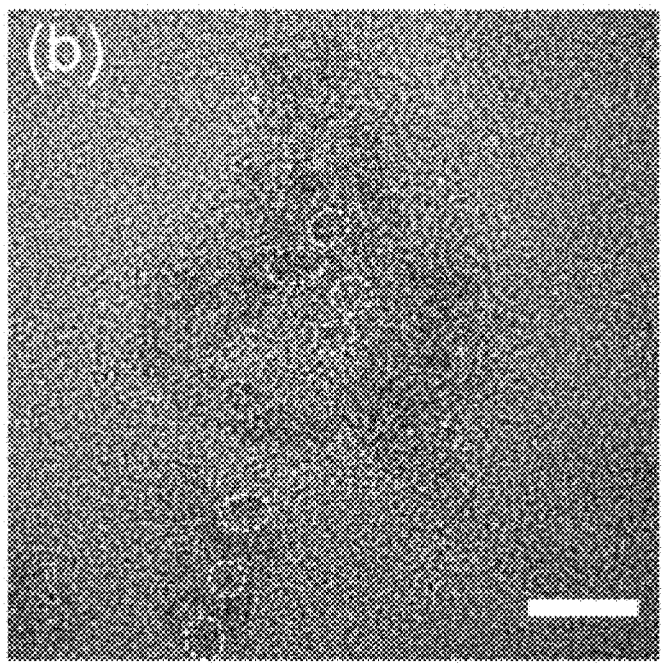
Figure 1:
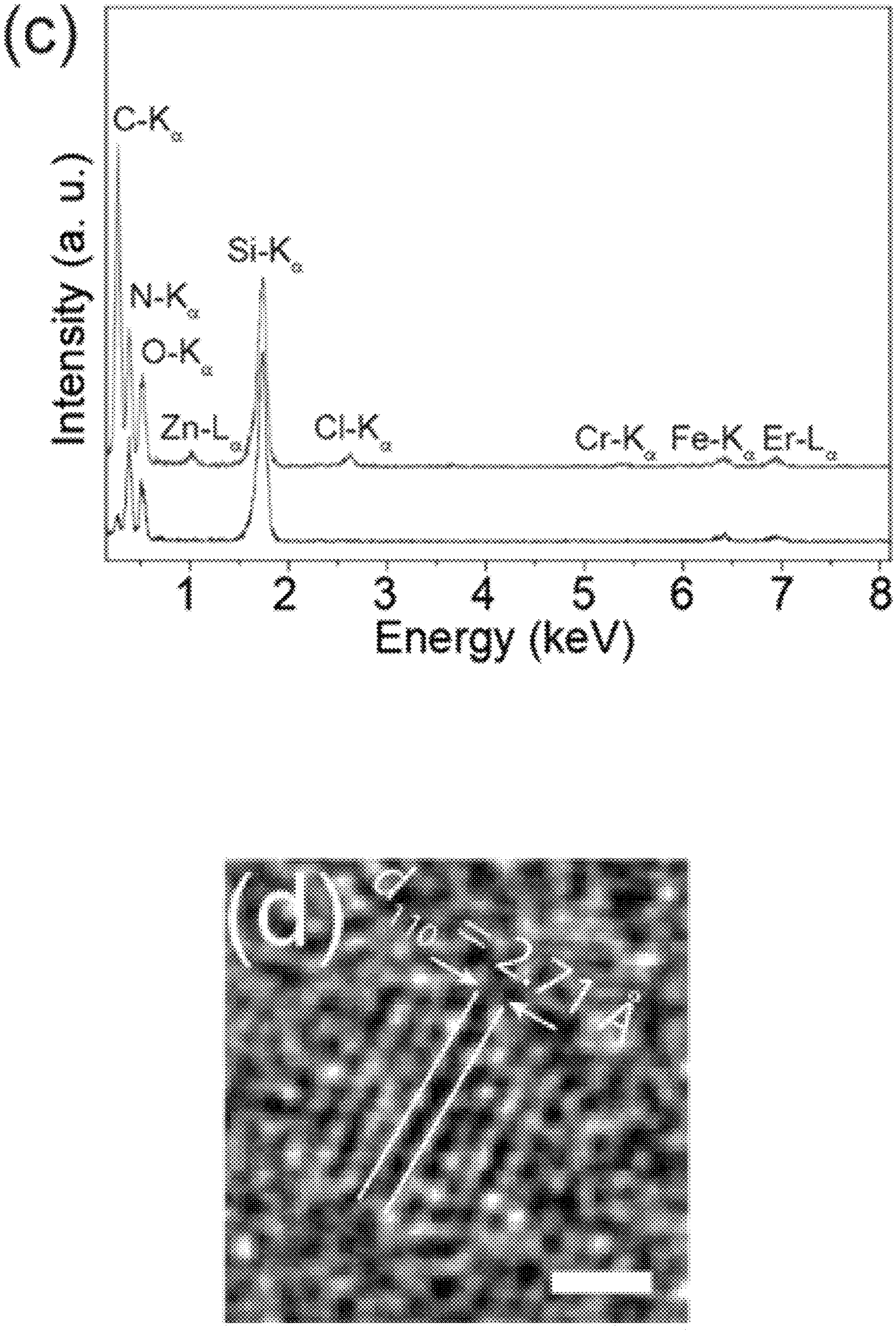
Figure 1:
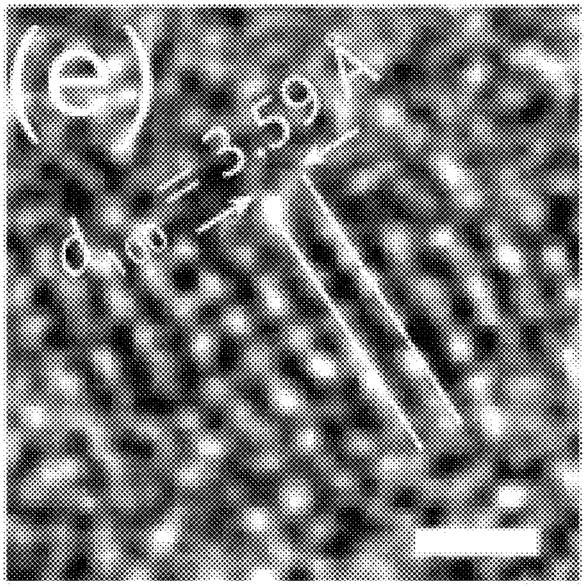
Figure 1:
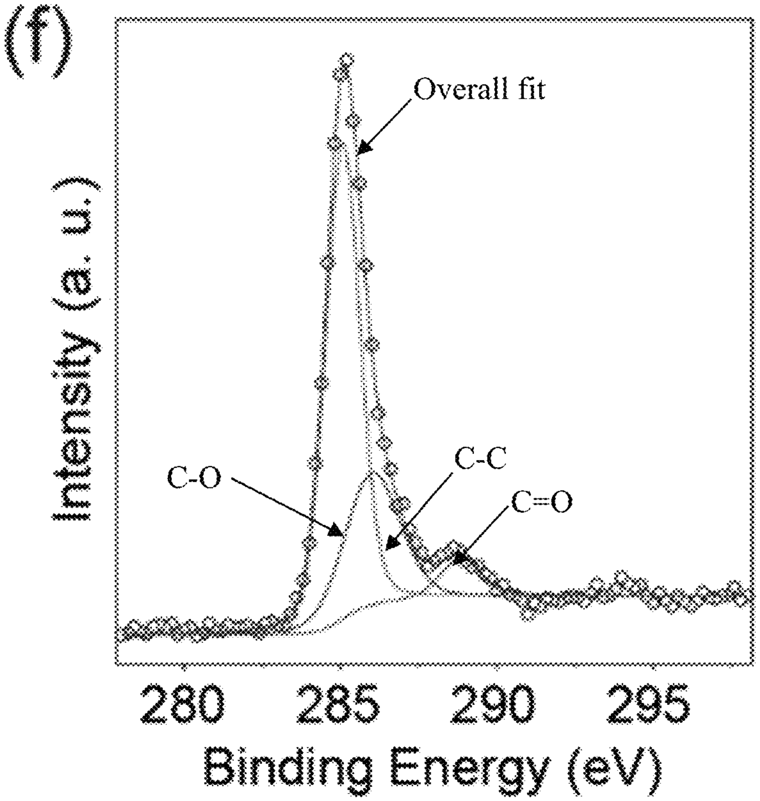
Figure 1:
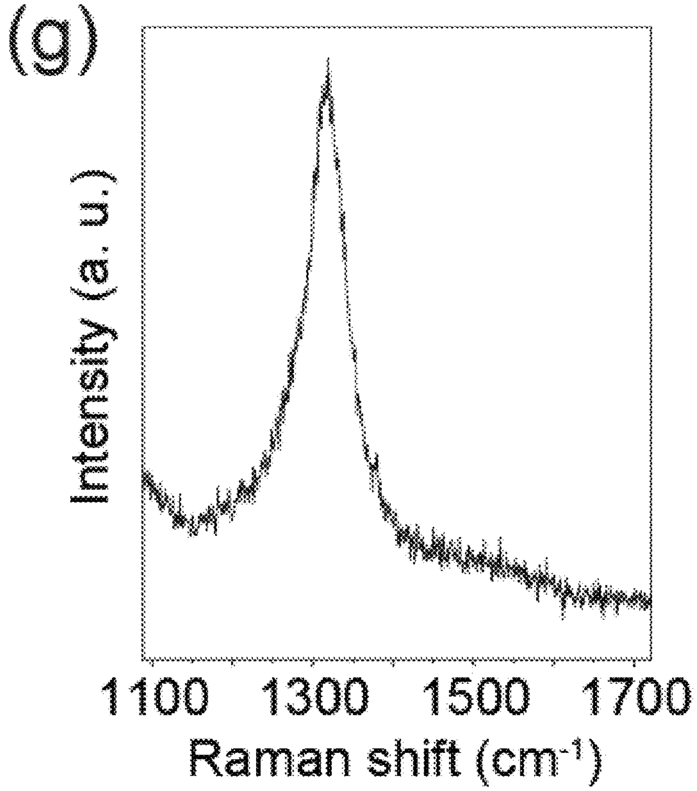
Figure 1:
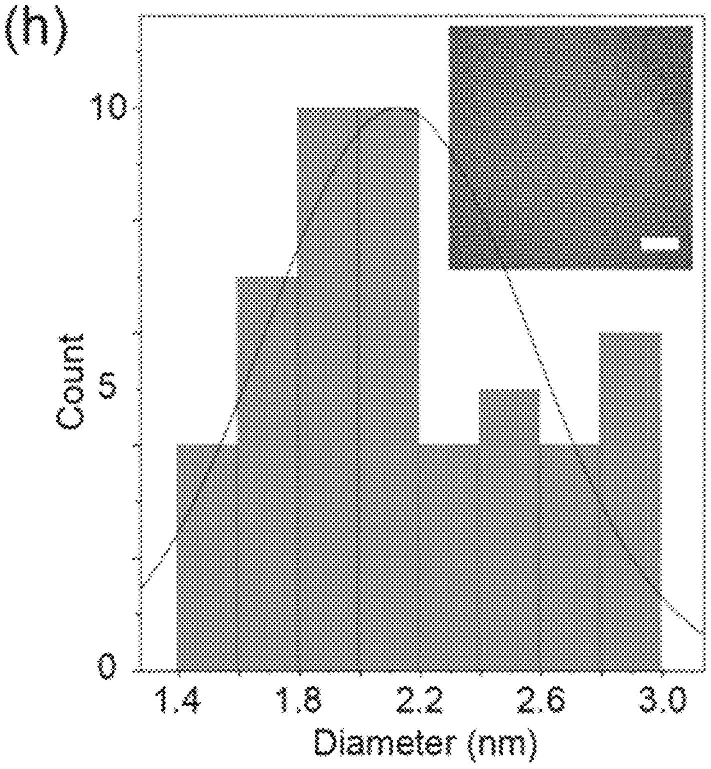
Figure 1:
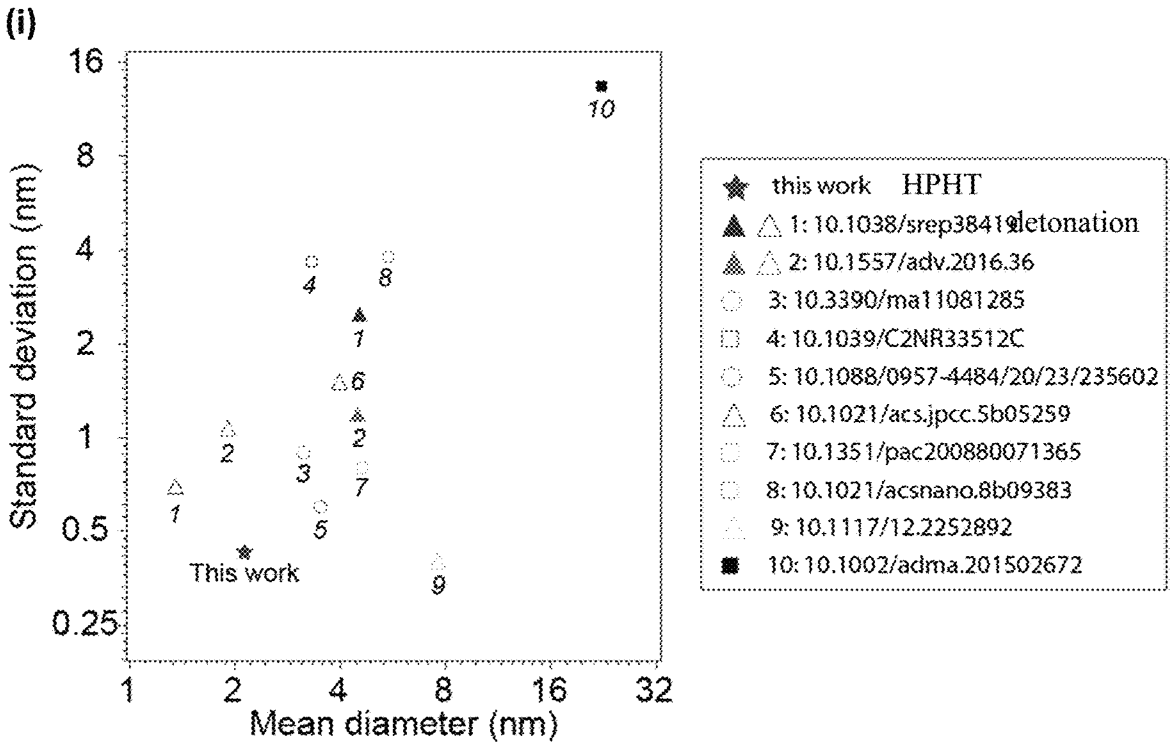

Nanoscale diamonds in the sub-five-nanometer size regime play critical roles in imaging, therapeutics and quantum information systems. State-of-the-art techniques including detonation, chemical vapor deposition, mechanical grinding and high-pressure-high-temperature synthesis yield nanodiamonds with broad distribution of sizes. Despite many efforts, direct synthesis of nanodiamonds with precise control of diameter remains an outstanding challenge. Herein is reported the synthesis of sub-five-nanometer nanodiamonds with high uniformity and purity. Inspired by the formation of natural diamond, iron carbide nanoparticles embedded in iron oxide matrices was used as the carbon source. High-pressure-high-temperature treatment of the precursor yields nanodiamonds with tunable diameters down to 2.13 nm and 0.22-nm standard deviation. A self-limiting, redox-driven and diffusion-controlled solid-state reaction is proposed as the mechanism of formation which is supported by in situ X-ray diffraction and ex situ characterizations. This work provides a unique mechanism for precise control of nanodiamond and paves the road for the full realization of their potentials in emerging technologies where the size is crucial. No other existing method can produce high quality sub-5-nm diamonds with a uniform and tunable size.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Con-*

*densed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

The recitation of a), b), c), . . . or i), ii), iii), or the like in a list of components or steps do not confer any particular order unless explicitly stated.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the molecular level, for example, to bring about a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

Wherever the term "comprising" is used herein, options are contemplated wherein the terms "consisting of" or "consisting essentially of" are used instead. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the aspect element. As used herein, "consisting essentially of" does not exclude materials or steps that do not materially affect the basic and novel characteristics of the aspect. In each instance herein any of the terms "comprising", "consisting essentially of" and "consisting of" may be replaced with either of the other two terms. The disclosure illustratively described herein may be suitably practiced in the absence of any element or elements, limitation or limitations which is not specifically disclosed herein.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below or otherwise described herein. The alkyl can also be optionally partially or fully unsaturated. As such, the recitation of an alkyl group can include an alkenyl group or an alkynyl group. The alkyl can be a monovalent hydrocarbon radical, as described and exemplified above, or it can be a divalent hydrocarbon radical (i.e., an alkylene).

The term "heteroatom" refers to any atom in the periodic table that is not carbon or hydrogen. Typically, a heteroatom is O, S, N, P. The heteroatom may also be a halogen, metal or metalloid.

As used herein, the term "substituted" or "substituent" is intended to indicate that one or more (for example, in various embodiments, 1-10; in other embodiments, 1-6; in some embodiments 1, 2, 3, 4, or 5; in certain embodiments, 1, 2, or 3; and in other embodiments, 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, haloalkyl, hydroxyalkyl, aryl, heteroaryl, heterocyclyl, cycloalkyl, alkanoyl, alkoxycarbonyl, amino, alkylamino, dialkylamino, carboxyalkyl, alkylthio, alkylsulfinyl, and alkylsulfonyl.

The term "sol-gel" refers to a wet-chemical process that involves the formation of an inorganic colloidal suspension (sol) and gelation of the sol in a continuous liquid phase (gel) to form a three-dimensional network structure.

Embodiments of the Technology

This disclosure provides a composition comprising:

a) uniform diamond particles wherein the diameter of the diamond particles is about 1 nm to about 5 nm and the diamond particles vary in diameter by ±0.3 nm or less; and b) a metal oxide;

wherein each diamond particle is enclosed or encapsulated by a layer of the metal oxide.

In various embodiments, the diameter of the diamond particles is about 0.5 nm, about 1.0 nm, about 1.5 nm, about 2.0 nm, about 2.5 nm, about 3.0 nm, about 3.5 nm, about 4.0 nm, about 4.5 nm, about 5.0 nm, or about 5.5 nm, or a range between any two of the aforementioned values.

In various embodiments, any one of the diameters disclosed herein, including the endpoints of a range, may vary in diameter by ±0.1 nm, ±0.2 nm, ±0.3 nm, ±0.4 nm, ±0.5 nm, ±0.6 nm, ±0.7 nm, ±0.8 nm, ±0.9 nm, ±1.0 nm, ±1.1 nm, ±1.2 nm, ±1.3 nm, ±1.4 nm, ±1.5 nm, ±1.6 nm, ±1.7 nm, ±1.8 nm, ±1.9 nm, or ±2.0 nm.

In various embodiments, the composition comprises a plurality of uniform nanodiamond particles, 2-5 uniform nanodiamond particles, 5-10 uniform nanodiamond particles, 10-25 uniform nanodiamond particles, 25-50 uniform nanodiamond particles, 50-100 uniform nanodiamond particles, 100-1,000 uniform nanodiamond particles, at 1,000-10,000 uniform nanodiamond particles, or at least 100,000 uniform nanodiamond particles.

In various embodiments, the metal oxide is a transition metal oxide. In various embodiments, the transition metal oxide is an iron oxide. In various embodiments, the transition metal oxide is iron(II) oxide (FeO). In various embodiments, the layer of the transition metal oxide is encapsulated by another layer (e.g., a second layer) comprising iron(III) oxide ($Fe_2O_3$).

In various embodiments, the composition or encapsulated diamond particles do not comprise graphite. In various embodiments, the diamond particles have no defects in their crystal lattice, as determined by Raman spectroscopy or X-ray photoelectron spectroscopy (XPS). In some embodiments, defects can be introduced controllably to provide diamond nanoparticles wherein the number of defects per diamond nanoparticle is less than about 100, less than about 90, less than about 80, less than about 70, less than about 60, less than about 50, less than about 40, less than about 30, less than about 20, less than about 15, less than 10, less than 9, less than 8, less than 7, less than 6, less than 105 less than 4, less than 3, or less than 2, for example, as determined by Raman spectroscopy or X-ray photoelectron spectroscopy (XPS). In various embodiments, the number of defects per diamond nanoparticle is about 1 to about 100, or about 10 to about 50, or the number can fall within a range of any two integers between 1 and 100.

In various embodiments, the defects are introduced controllably, for example, by doping with one or more heteroatoms. In various embodiments, the diamond particles comprise functional defects or color centers that are controllably introduced via methods disclosed herein or by other methods known to persons skilled in the art.

In various embodiments, the diamond particles comprise a nitrogen-vacancy (NV) color center. In some embodiments, NV is neutral or negatively charged. In some embodiments, a neutral NV has fluorescence at a wavelength of about 576 nm (a yellow color), or about 570 nm to about 685 nm. In certain embodiments, a negative NV has fluorescence at a wavelength of about 637 nm (a red color), or about 630 nm to about 645 nm.

In various embodiments, the diamond particles or diamond precursors comprise one or more carbon vacancies. In certain embodiments, the carbon vacancies are adjacent to the heteroatoms.

In various embodiments, the diamond particles are doped with one or more heteroatom(s) such as silicon and/or nitrogen. In various embodiments, each heteroatom is the same. In various embodiments, the diamond nanoparticles are doped with heteroatoms that are a combination of two or more different heteroatoms. In various embodiments, the diamond particles are doped with a heteroatom, wherein optionally the doped diamond particles further comprise carbon vacancies, and wherein optionally the carbon vacancies are adjacent the heteroatom. In various embodiments, the heteroatom is B, Li, N, O, Ge, Al, Si, P, Ne, Xe, etc. In various embodiments, the heteroatom is H, F, Ni, Co, Al, In, Tl, As, Sb, He, Ag, Zn, Ti, Zr, Ta, Cr, W, Fe, or a lanthanide (e.g., one of elements 57-71).

In various embodiments, the heteroatoms are accompanied by vacancies, i.e., carbon atoms missing from their lattice sites. For example, a nitrogen atom in diamond plus a carbon vacancy next to it form the nitrogen-vacancy (NV) center, and a silicon atom plus two carbon vacancies next to it forms the silicon-vacancy (SiV) center. In other embodiments one or more heteroatoms may be present that do not have carbon vacancies.

In various embodiments, the diameter of the diamond particles is 3.15 nm±0.23 nm, 2.49 nm±0.22 nm, 2.22 nm±0.22 nm, 2.13 nm±0.22 nm, or 1.75 nm±0.18 nm.

In general, this disclosure provides the preparation of a composition of $Fe_2C$ nanoparticles embedded in $Fe_2O_3$. For example, a composition comprises a colloid, gel, or colloidal gel comprising metal carbide nanoparticles, a metal salt, and an organic acid. In various embodiments, the metal carbide is hydrophilic. In other embodiments, the metal carbide is hydrophobic. In yet other embodiments, the polarity of the metal carbide is inverted.

In some embodiments, this disclosure provides a colloid, gel, or colloidal gel comprising hydrophilic iron carbide ($Fe_2C$) nanoparticles, iron(III) nitrate ($Fe(NO_3)_3$), and an organic acid (e.g., citric acid), wherein the $Fe_2C$ nanoparticles have a diameter of about 5 nm to about 15 nm, the $Fe_2C$ nanoparticles vary in diameter by ±1.5 nm or less, the $Fe_2C$:$Fe(NO_3)_3$ molar ratio (or stoichiometry) is about 1:1 to about 1:6, and the nanoparticles are uniformly distributed in the iron(III) nitrate.

In some embodiments, the metal carbide is an iron carbide, such as $Fe_2C$, $Fe_3C$, or $Fe_5C2$. In some embodiments, the metal salt is iron(III) nitrate ($Fe(NO_3)_3$), iron(III) sulfate ($Fe_2(SO_4)_3$), or an iron(III) halide, such as $FeCl_3$.

This disclosure provides an iron composite comprising: iron carbide ($Fe_2C$) nanoparticles and iron(III) oxide ($Fe_2O_3$) in a $Fe_2C$:$Fe_2O_3$ molar ratio of about 1:1 to about 1:6; wherein the $Fe_2C$ nanoparticles have a diameter of about 5 nm to about 15 nm, the diameter of each of the particles varies by ±1.5 nm or less, and the $Fe_2C$ nanoparticles are uniformly distributed in the $Fe_2O_3$.

In various embodiments, the colloid, gel, or colloidal gel comprises a weight percent of water from 0% or greater. In various embodiments, the wt. % of water is about 5%, about 10%, about 15%, about 20%, about 25%, about 30%, about 35%, about 40%, about 50%, about 55%, about 60%, about 65%, about 70%, about 75%, about 80%, about 85%, about 90%, about 95%, or about 100%.

Additionally, this disclosure provides a method for forming diamond nanoparticles comprising:

a1) decomposing iron pentacarbonyl ($Fe(CO)_5$) to form iron nanoparticles wherein the time to decompose $Fe(CO)_5$ determines the size of the iron nanoparticles;

a2) carburizing of the iron nanoparticles to form hydrophobic iron carbide nanoparticles, wherein the hydrophobic iron carbide nanoparticles comprise an alkylamine bound (or bonded) to its surface, and the hydrophobic nanoparticles have a diameter of about 5 nm to about 15 nm and the hydrophobic nanoparticles vary in diameter by ±1.5 nm or less;

a3) optionally doping the hydrophobic iron carbide nanoparticles with heteroatoms at the carburizing step (a2);

a4) inverting the polarity of hydrophobic iron carbide nanoparticles to hydrophilic iron carbide nanoparticles;

b) dispersing the hydrophilic nanoparticles in a pH neutral solution of iron(III) nitrate ($Fe(NO_3)_3$);

c) heating the mixture of dispersed hydrophilic nanoparticles to form a colloidal gel;

d) calcining the gel in the presence of oxygen to form a composite of $Fe_2C$ uniformly distributed in iron(III) oxide ($Fe_2O_3$); and e) applying heat and pressure to the composite under conditions suitable for uniform diamond formation.

In some embodiments, the hydrophobic iron carbide nanoparticles or hydrophilic iron carbide nanoparticles are doped with a heteroatom. In some embodiments, the uniform diamond nanoparticles have a diameter of 5 nm or less. In various embodiments, the composite has an $Fe_2C$:$Fe_2O_3$ molar ratio of about 1:1 to about 1:6. In various embodiments, the hydrophobic nanoparticles are exchanged to hydrophilic nanoparticles by ion exchange at the surface of the hydrophobic nanoparticles.

In some embodiments, inverting the polarity of the hydrophobic nanoparticles comprises exchanging an alkylamine bound to the surface of the hydrophobic nanoparticles with a citrate ion to form hydrophilic nanoparticles.

In some embodiments, the method further comprises i) adding silica colloidal particles to the mixture; ii) removing silica from the calcined colloidal gel (e.g., the composite) with an alkaline solution to form a mesoporous composite; and iii) annealing the mesoporous composite in ammonia to nitridate iron carbide nanoparticles prior to applying HPHT; wherein the uniformly sized nanodiamond particles comprise fluorescent nitrogen vacancies. In some embodiments, the alkaline solution comprises an alkali base. In some embodiments, heating, and/or calcining and/or annealing is performed at a temperature of about 50° C., about 70° C., about 90° C., about 120° C., about 150° C., about 300° C., about 400° C., about 500° C., about 600° C., about 700° C., or about 800° C.

In some embodiments, the method further comprises hydrogenating the nanodiamond particles to form neutral nitrogen vacancies. In some other embodiments, the method further comprises heating the nanodiamond particles in air to form negatively charged nitrogen vacancies.

In various embodiments, the composite is heated to a temperature of about 1200 K, about 1300 K, about 1400 K, about 1500 K, about 1600 K, about 1700 K, about 1800 K, about 1900 K, about 2000 K or more. In various embodiments, the composite is pressurized to about 6 GPa, about 7 GPa, about 8 GPa, about 9 GPa, about 10 GPa, about 11 GPa, about 12 GPa, about 13 GPa, about 14 GPa, about 15 GPa, about 16 GPa, about 17 GPa, about 18 GPa, about 19 GPa, about 20 GPa or more.

In various embodiments, the applied heat and pressure is performed in a diamond anvil cell (DAC) or a multi-anvil apparatus at a temperature of about 1300 K to about 1500 K and a pressure of 8 GPa to about 15 GPa. In various embodiments, applied heating is performed using resistive or laser heating.

In various embodiments, each one of the formed diamond nanoparticles is encapsulated in a layer of iron oxide. In various embodiments, the method further comprises dissolving the encapsulated diamond nanoparticles in an acid and isolating the diamond nanoparticles, wherein the diamond nanoparticles are separated from the iron oxide. In some embodiments, acid treatment (e.g., a mineral acid) hydrogenates the surface of the nanodiamond.

In various embodiments, the diameter of the diamond particles is about 1 nm to about 5 nm and the diamond particles vary in diameter by ±0.3 nm or less. In various embodiments, the colloidal gel is doped with one or more heteroatoms. In various embodiments, the method further comprises doping the dispersion of the hydrophilic nanoparticles in the pH neutral solution of iron(III) nitrate ($Fe(NO_3)_3$), doping the colloidal gel, or doping the precursor as described herein.

In various embodiments, the calcined colloidal gel forms a composite of hexagonal iron carbide ($Fe_2C$) nanoparticles uniformly distributed in rhombohedral hematite ($Fe_2O_3$).

This disclosure additionally provides a method for forming uniformly sized fluorescent nanodiamond particles comprising:

a) inverting the polarity of hydrophobic iron carbide nanoparticles comprising exchanging an alkylamine bound to the surface of the hydrophobic nanoparticles with a citrate ion to form hydrophilic nanoparticles;
b) dispersing the hydrophilic nanoparticles in a pH neutral solution of iron(III) nitrate ($Fe(NO_3)_3$) and adding silica colloidal particles to form a mixture;
c) heating the mixture to form a colloidal gel;
d) calcining the colloidal gel in the presence of oxygen to form a composite of iron carbide ($Fe_2C$) nanoparticles that are uniformly distributed in iron(III) oxide ($Fe_2O_3$), wherein the composite has an $Fe_2C$:$Fe_2O_3$ molar ratio of about 1:1 to about 1:6. and/or the $Fe_2C$ nanoparticles have a diameter of about 5 nm to about 15 nm and the diameter of each of the particles varies by ±1.5 nm or less;
e) removing silica from the composite with an alkaline solution to form a mesoporous composite;
f) annealing the mesoporous composite in ammonia;
g) applying a high pressure and high temperature (HPHT) to the annealed mesoporous composite suitable for forming uniformly sized fluorescent nanodiamond particles having a diameter of 5 nm or less, wherein the uniformly sized fluorescent nanodiamond particles comprise fluorescent nitrogen vacancies; and
h) optionally hydrogenating the nanodiamond particles to form neutral nitrogen vacancies and/or optionally heating the nanodiamond particles in the presence of oxygen to form negatively charged nitrogen vacancies.

Furthermore, this disclosure provides a process for the synthesis of nanodiamonds, comprising: synthesizing metal carbide nanoparticles, incorporating the metal carbide nanoparticles into a metal oxide matrix, and converting the incorporated metal carbide nanoparticles into nanodiamonds by applying high temperature and high pressure to the metal oxide matrix.

In various embodiments, the metal carbide nanoparticles are iron carbide [$Fe_2C$] nanoparticles and the metal oxide matrix is an iron oxide [$Fe_2C@Fe_2O_3$] matrix.

In various embodiments, the synthesis of the [$Fe_2C$] nanoparticles comprises thermally decomposing iron pentacarbonyl [$Fe(CO)_5$] in the presence of $NH_4OH$ and oleylamine (OAm) for 30 minutes, followed by carburizing in an octadecanamine (ODA) carbon-source solvent at a temperature range of about 200-400° C.

In various embodiments, tuning the size of the [$Fe_2C$] nanoparticles in a 6-13 nm range is achieved by varying the decomposition times of the iron pentacarbonyl.

In various embodiments, the process further incorporates heteroatom dopants into the $Fe_2C$ nanoparticles.

In various embodiments, incorporating the heteroatom dopants into the $Fe_2C$ nanoparticles is carried out by adding a heteroatom source to the carbon-source solvent.

In various embodiments, the heteroatom source comprises nitrogen (N) or silicon (Si).

In various embodiments, the [$Fe_2C$] nanoparticles are converted into hydrophilic [$Fe_2C$] nanoparticles by combining the [$Fe_2C$] nanoparticles with a 0.5M citric acid solution for 24 hours.

In various embodiments, the hydrophilic [$Fe_2C$] nanoparticles are embedded in an iron oxide [$Fe_2C@Fe_2O_3$] matrix via a sol-gel method, with the sol gel method comprising: combining a 0.5M citric acid solution with a 0.1M iron nitrate solution, followed by adding the [$Fe_2C$] nanoparticles, and subsequently heating at about 70° C. until the iron oxide [$Fe_2C@Fe_2O_3$] matrix is formed.

In various embodiments, the [$Fe_2C$] nanoparticles are converted into nanodiamonds by applying a high-temperature high-pressure process to the [$Fe_2C@Fe_2O_3$] matrix.

In various embodiments, the high-temperature high-pressure process comprises pressures of 8-15 GPa and temperatures of 1300-1500K.

In various embodiments, the high temperature high-pressure process is performed by applying pressure to the [$Fe_2C@Fe_2O_3$] matrix with a symmetrical diamond anvil cell and heating the [$Fe_2C@Fe_2O_3$] matrix with 1064-nm lasers.

Results and Discussion

HPHT treatment (6-10 GPa, ~1400 K) of the precursor was found to yield uniform sub-5-nm NDs. TEM of the product reveals highly crystalline NPs with 2-3 nm diameters (FIG. 1*b*). Energy-dispersive X-ray spectroscopy (EDS) shows that the NPS consist of carbon (Figure ic). The lattice spacings of 2.71 and 3.59 Å correspond to the (110) and (100) crystallographic planes of diamond respectively (FIG. 1*d-e*). These results confirm the formation of ultrasmall NDs. Interestingly, the (111) spacing (2.06 Å) commonly observed in NDs from PECVD, detonation and HPHT of hydrocarbons was not observed. This is attributed to the different surface facets exposed in the prepared sample: While {111} is the most stable surface for bulk diamond, the sub-5-nm sizes of the disclosed NDs and the oxygen-rich growth environment energetically favor the {100} and {110} facets instead, allowing the observation of (100) and (110) lattices fringes. This is indeed supported by density-functional tight binding (DFTB) simulations. X-ray photoelectric spectrum (XPS) at C-1s edge reveals three peaks (FIG. 1*f*). The 285.1 eV peak ((C—C), FIG. 1*f*) is attributed to the $sp^3$ carbon in the body of the NDs. The peak positions at higher binding energies (286.1 eV (C—OH); and 288.9 eV (C═O), FIG. 1*f*) are consistent with carbon in C—O and C═O species from oxygenated surfaces. Importantly, no peaks corresponding to $sp^2$ (graphitic) carbon were observed. Raman spectrum (FIG. 1*g*) shows a single peak at 1320 $cm^{-1}$ corresponding to the D-band of diamond. The absence of G-band further confirms the absence of graphitic carbon in the disclosed HPHT NDs.

The uniformity of the ND sizes obtained by this approach shows substantial improvement over existing methods. Analysis of ~40 NDs synthesized with 9.54±0.70 nm $Fe_2C$ NPs reveals an average ND diameter of 2.13±0.22 nm (FIG. 1*h*). This result represents substantially reduced mean size and variation of as-synthesized NDs from both detonation and HPHT methods (solid symbols, FIG. 1*g*), and are on par with the best results from NDs after post-synthetic treatment including oxidation, chemical modification and centrifugation (open symbols, FIG. 1*g*).

The ND size was hypothesized to be determined by the available carbon feedstock in individual $Fe_2C$ NPs. To test this, NDs were synthesized using $Fe_2C$ NPs with 8.26±0.67 nm, 9.48±1.31 nm, and 12.80±1.22 nm diameters (FIG. 2*a-c*). The resultant NDs have diameters of 2.13 nm, 2.49 nm, 3.15 nm, respectively (FIG. 2*d-f*). Indeed, a linear dependence of the ND diameter on that of the $Fe_2C$ diameter (FIG. 2*g*) was observed, demonstrating size control with sub-nanometer precision.

Next, it was shown that the ND formation is accompanied by the redox reaction between $Fe_2C$ and $Fe_2O_3$. XPS at the Fe-2p edge (FIG. 3*a*) of the precursor reveals a strong peak at 707.3 eV (Fe(0), FIG. 3*b*) that is attributed to Fe(0) from $Fe_2C$ in the precursor. Notably, the intensity of this peak decreases substantially after the HPHT reaction, indicating the consumption of Fe(0). Concurrently, an increase of the peak intensity at 710.0 eV ((Fe(II), FIG. 3*b*) was observed, which corresponds to Fe(II) species, suggesting the formation of ferrous compounds. To further investigate the fate of the iron species, the powder X-ray diffraction (PXRD) before and after HPHT treatment was measured. Most notably, three new peaks emerge at 2θvalues of 10.87, 12.48, and 15.00 degrees (upward triangles, FIG. 3*c*). A careful search of the Powder Diffraction Database reveals their identities as non-stoichiometric ferrous oxides: $Fe_{0.998}O$ (PDF #: 04-002-3667) or $Fe_{2.89}O_{4.51}$ (PDF #: 01-075-9673). Note that the diamond peaks are overshadowed by those of remaining $Fe_2O_3$ in the product. The XPS and PXRD data show that Fe(0) in the $Fe_2C$ precursor is converted to Fe(II) oxides in the product.

Figure 3:
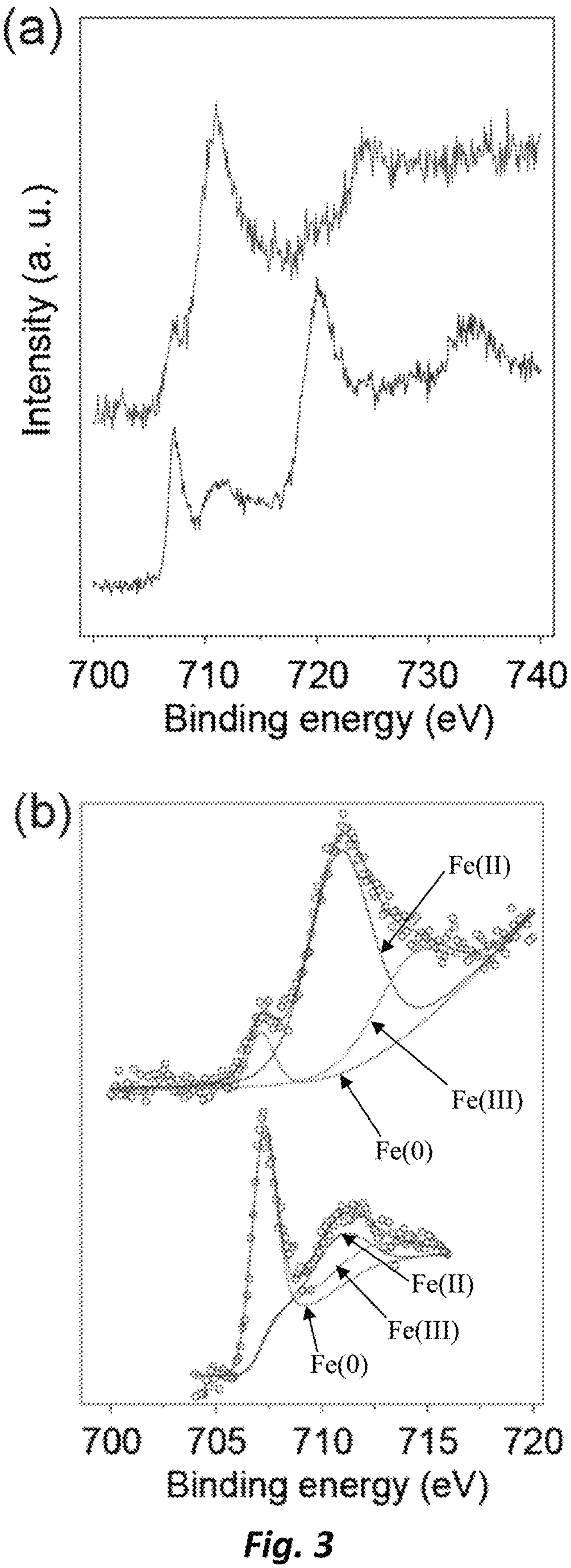
FIG. 3. Reaction mechanism. (a) XPS at Fe-2p edge of the precursor (bottom trace) and HPHT product (top trace). (b) Zoom-in view of (a) in the $2p^{3/2}$ range. Open circles denote experimental data and the overall fit. Solid lines denote three components of the fitting attributed to Fe(0), Fe(II) and Fe(III), respectively. Top, HPHT product. Bottom, precursor. (c) In situ XRD of the precursor (bottom trace) and HPHT product (top trace). Circle: $Fe_3O_4$ (PDF #: 01-071-4918); star: $Fe_2O_3$(PDF #: 01-078-6916); hexagonal: $Fe_3C$ (PDF #: 01-072-1110); square: $Fe_2C$ (PDF #: 00-017-0897); cross: $Mg_2C_3$ (PDF #: 00-001-1138); x: Fe (PDF #: 01-071-4409); downward triangle: $MgFe_2O_4$ (PDF #: 01-073-1960); upward triangle: $Fe_{2-\delta}O$ (PDF #: 04-002-3667, 01-075-9673). (d) ND size distribution from samples with different $Fe_2C$:$Fe_2O_3$ ratios. Top: 1:1; Bottom: 1:5. $Fe_2C$ NP diameter: 12.80 nm. (e) ND size distribution from samples prepared at different pressures. Top: 8.9 GPa; Bottom: 16 GPa. $Fe_2C$ NP diameter and $Fe_2C$:$Fe_2O_3$ ratios are 9.54 nm and 1:5, respectively. (f) Proposed mechanism.
Figure 3:
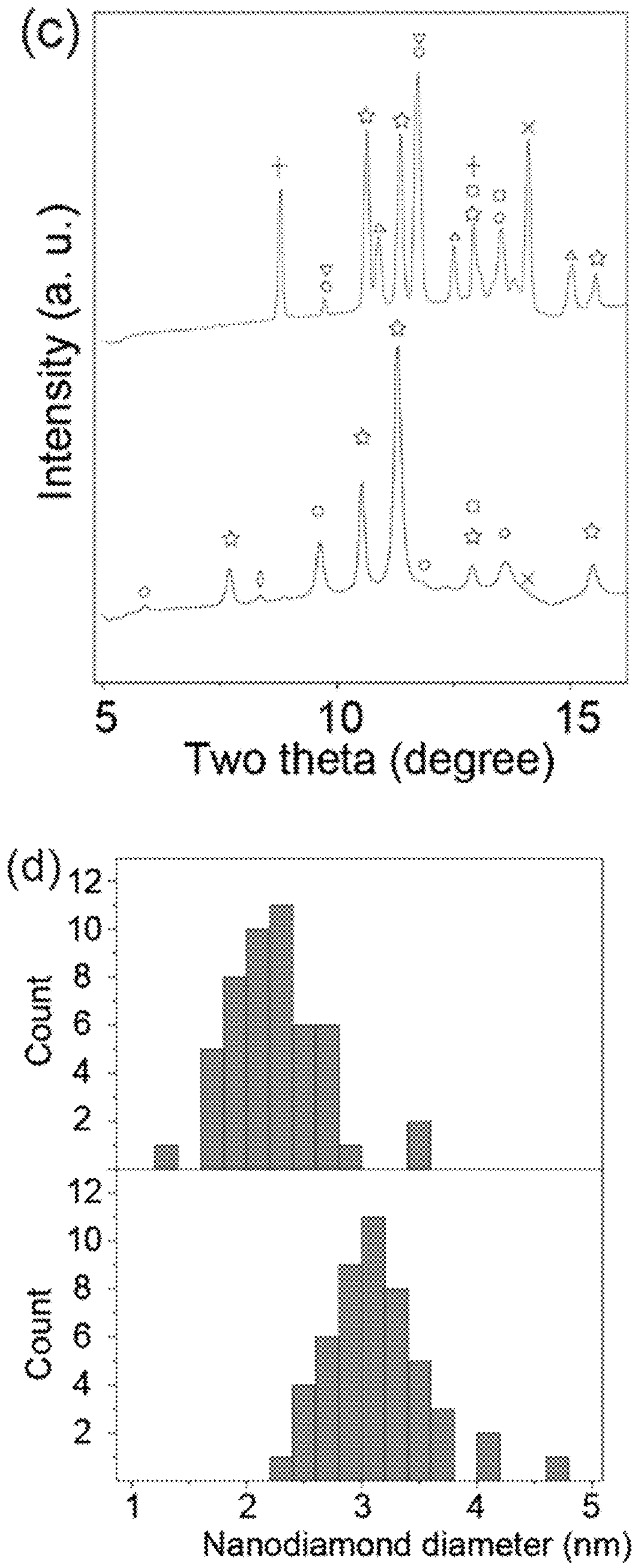
Figure 3:
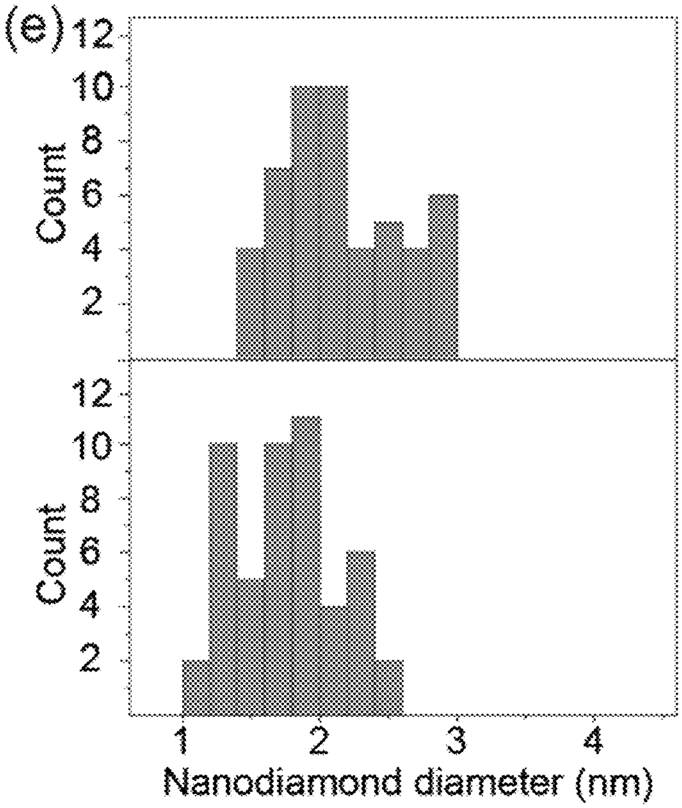
Figure 3:
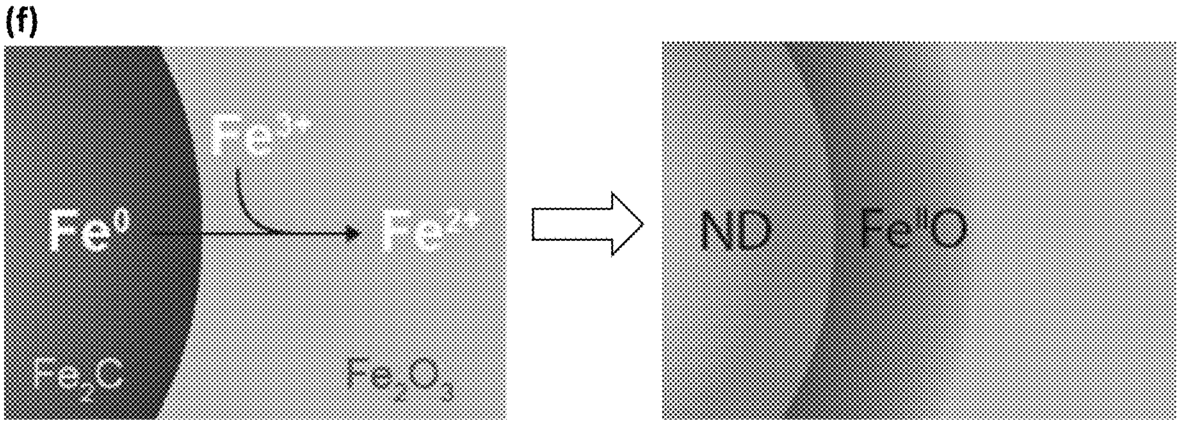

To further examine the relation between ND formation and the redox reaction between Fe species, the size of NDs formed by 12.8-nm $Fe_2C$ NPs with different $Fe_2C$:$Fe_2O_3$ ratios was characterized (FIG. 3*d*). The average size of NDs from a precursor with 1:1 $Fe_2C$:$Fe_2O_3$ ratio decreases to 2.22±0.22 nm, comparing to 3.15±0.23 nm from the precursor with 1:5 $Fe_2C$:$Fe_2O_3$ ratio. The stoichiometry between $Fe_2C$ and $Fe_2O_3$ for the formation of FeO and diamond is 1:2 (Eq. 1). A 1:1 $Fe_2C$:$Fe_2O_3$ ratio results in an incomplete reaction and a smaller diameter of ND. Assuming that all carbon atoms in the $Fe_2C$ are converted into diamond, the theoretical ND diameter should be 7.48 nm, ~2.4 times the average ND diameter (3.15 nm) obtained from the 1:5 $Fe_2C$:$Fe_2O_3$ precursor. This is attributed to the oxidation of diamond by excessive $Fe_2O_3$ under HPHT conditions, forming byproducts (e.g., $CO_2$).

Lastly, the ND formation was shown to be diffusion-controlled by examining the effect of pressure on the ND sizes. Higher pressure thermodynamically favors diamond yet kinetically hinders diffusion of the iron species across the carbide-oxide interface, inhibiting ND formation. To this end NDs at different pressures were synthesized using 9.54±0.70 nm $Fe_2C$ NPs and 1:5 $Fe_2C$:$Fe_2O_3$ ratio. By increasing the growth pressure from 9 to 16 GPa, the average ND diameter decreases from 2.13±0.22 to 1.75±0.18 nm (FIG. 3*e*). Further increasing the pressure to 37 GPa yields no ND.

Based on these observations, a redox-driven, diffusion-controlled growth model (FIG. 3*f*) was proposed. Under HPHT conditions, both iron carbide and hematite are in the solid phase. The Fe(0) species in $Fe_2C$ NPs diffuse into the $Fe_2O_3$ matrix and react with the Fe(III) to form Fe(II) species on/near the carbide-oxide interface. This leads to segregation of carbon from the $Fe_2C$ NPs and formation of NDs under high pressure.

In conclusion, the redox chemistry for diamond formation described here is fundamentally different from those involving decomposition of hydrocarbons and/or phase transformation of graphite. Importantly, the mechanism allows self-limiting size control, i.e., ND growth is terminated once all the carbon in the $Fe_2C$ NP is consumed. The solid $Fe_2O_3$ matrix prevent the migration and fusion of $Fe_2C$ NPs. The uniform sub-5-nm NDs provide the platform to tackle questions central to ND-based technologies including their size-dependent cytotoxicity and size-confined deterministic incorporation of single color centers.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. General Methods

The diamond nanoparticle precursor was synthesized by colloidal and sol-gel chemistry. Briefly, $Fe_2C$ NPs with different sizes is prepared with the pyrolysis of $Fe(CO)_5$ (i) followed by carburization (ii) (Chem. Sci. 2017, 8 (1), 473) with optional doping (iii). Next, the hydrophobic NPs are rendered hydrophilic by surface ion exchange (iv) (Langmuir 2007, 23 (4), 2158). Then, the $Fe_2C$ NPs are uniformly embedded into $Fe_2O_3$ using a sol-gel process (v) (IEEE Trans. Magn. 2014, 50 (8), 1). HPHT synthesis is carried out in a diamond anvil cell (DAC) using two 1064-nm lasers for heating (vi) (Quantum Beam Sci. 2018, Vol. 2, Page 4 2018, 2 (1), 4). The HPHT products are dissolved in hydrochloric acid to recover the NDs (vii). Details of the synthesis (steps i-vii) and characterizations are described below.

Example 2. Synthesis of $Fe_2C$ NPs

Figure 2:
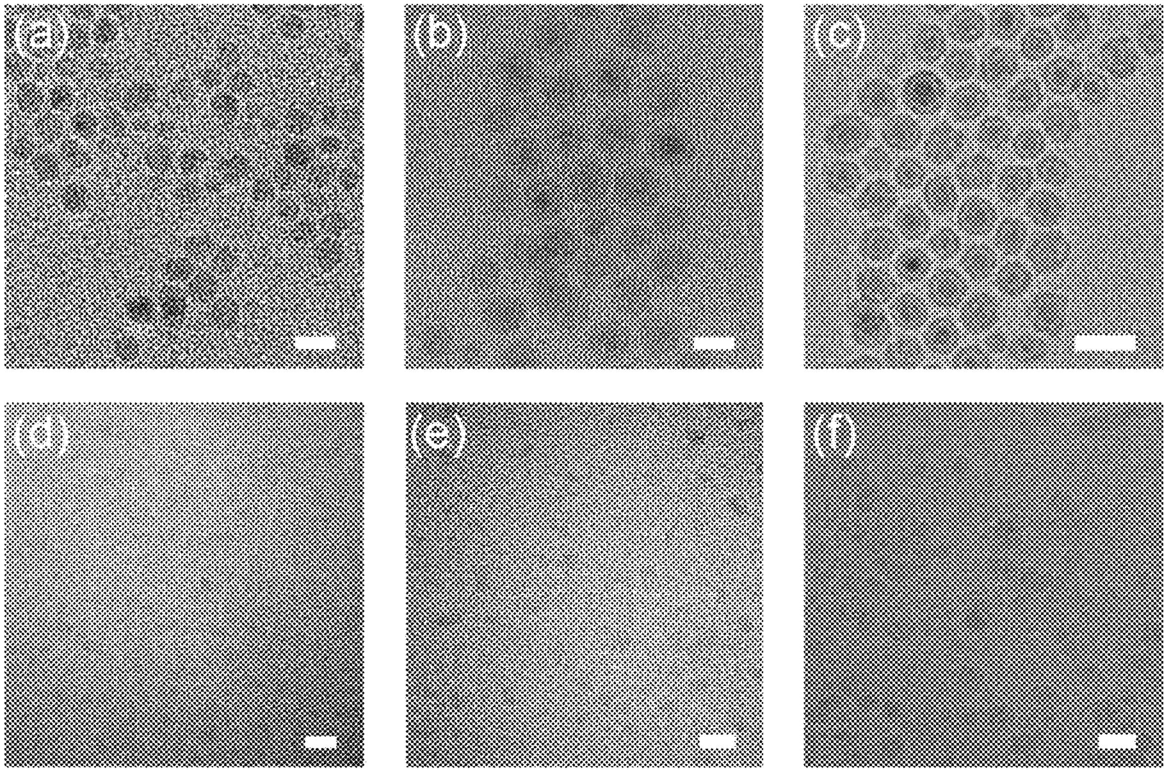
FIG. 2. Size control of ND. (a-c) TEM images of $Fe_2C$ NPs with average diameters of 8.26±0.67 nm (a), 9.47±1.31 nm (b) and 12.80±1.22 nm (c), respectively. Scale bars, 10 nm. (d-f) TEM images of NDs from $Fe_2C$ NPs in (a-c). Scale bars, 5 nm. (g) Dependence of ND diameter on $Fe_2C$ NP diameter. The square symbol, vertical and horizontal bars and the solid straight line denotes average sizes, standard deviations and the linear fit, respectively. (h) Transmission electron microscopy (TEM) showing highly crystalline sub-5-nm nanodiamonds.
Figure 2:
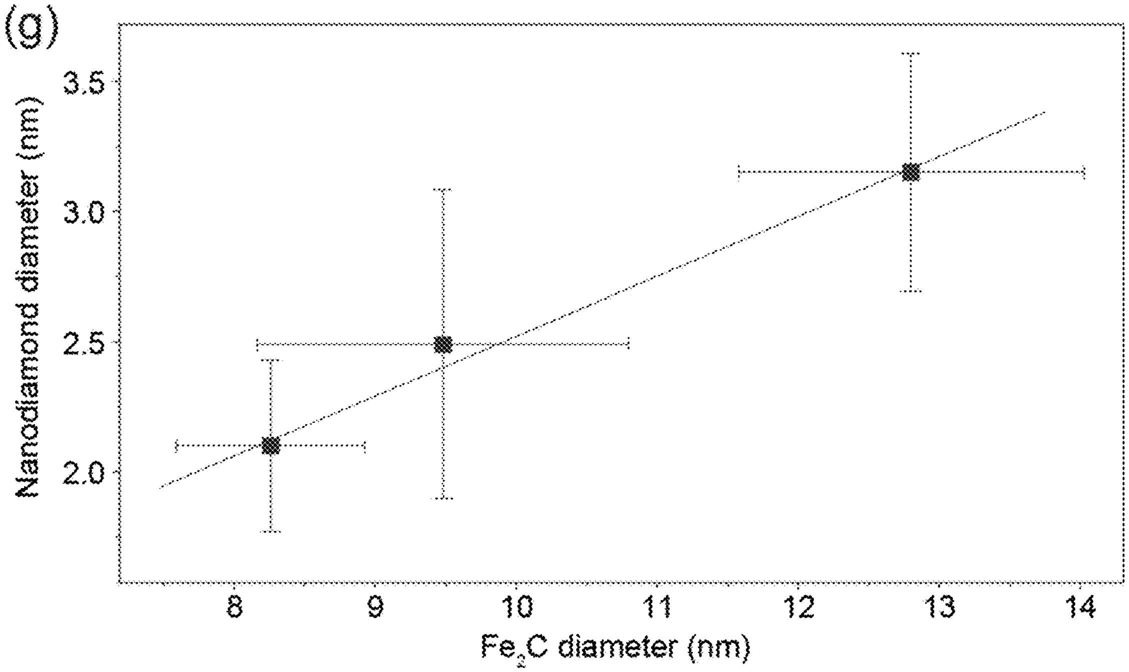
Figure 2:
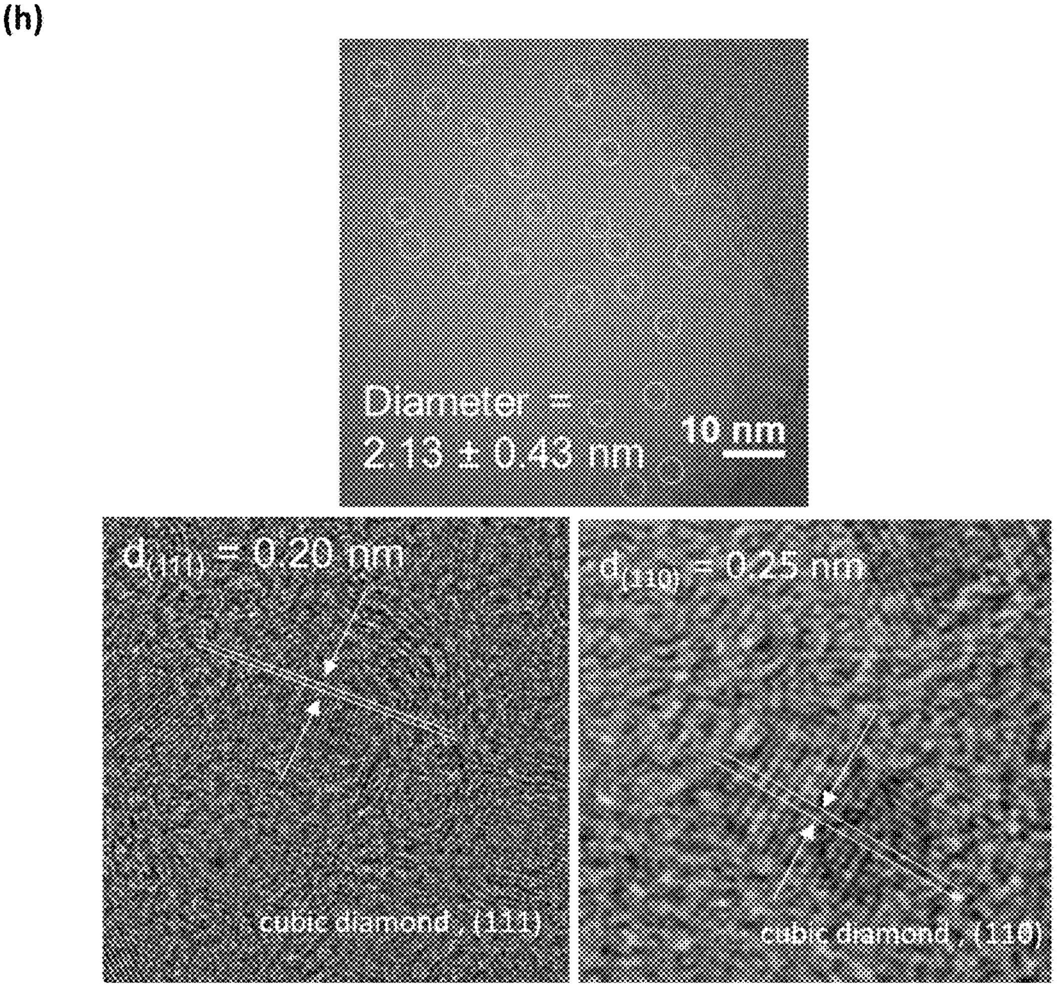
Figure 5:
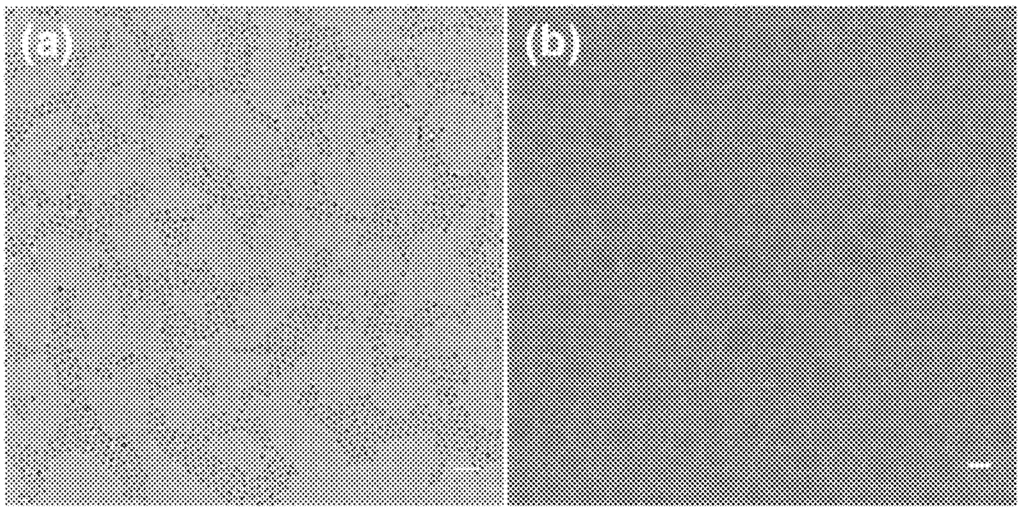
FIG. 5. TEM of precursors. (a) Fe NPs. Scale bar, 50 nm. (b) $Fe_2C$ NPs. Scale bar, 10 nm.

The synthesis of $Fe_2C$ NPs and $Fe_2O_3$ follows established methods noted above (Scheme 1). In a typical experiment, $Fe_2C$ NPs were obtained by the decomposition of 5 mmol $Fe(CO)_5$ in a mixture of 62.5 mmol 1-octadecene (ODE), 0.1 mmol $NH_4OH$, and 1 mmol oleylamine (OAm) at 180° C. for 30 min under nitrogen atmosphere (i), followed by carburization (ii) at 280° C. for 15 min using 37.5 mmol octadecanamine (ODA) as carbon source (FIG. 5). The products are washed with ethanol and dispersed in hexanes. The diameter of the $Fe_2C$ NPs can be tuned in the range of 6-13 nm by the $Fe(CO)_5$ decomposition time (FIG. 2).

Scheme 1. General synthesis of $Fe_2C$NP.

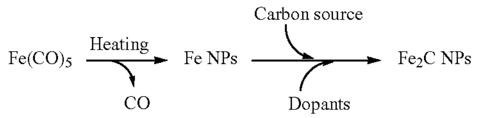

Scheme 1 outlines the process where $Fe_2C$ nanoparticles are obtained through thermal decomposition of iron pentacarbonyl [$Fe(CO)_5$], followed by carburization procedure. Dopants such as Si can be introduced (iii) together with the carbon source. Also, the size of the $Fe_2C$ nanoparticles is tunable by reaction conditions (temperature, reaction time, concentrations of reactants). This route allows for the synthesis of sub-5-nm nanodiamond with uniform and tunable sizes via the preparation of a $Fe_2C$@$Fe_2O_3$ composite material as a precursor for nanodiamonds. This method easily allows nanodiamonds to be doped with heteroatoms.

Example 3. Polarity Inversion of $Fe_2C$ NPs

Figure 4:
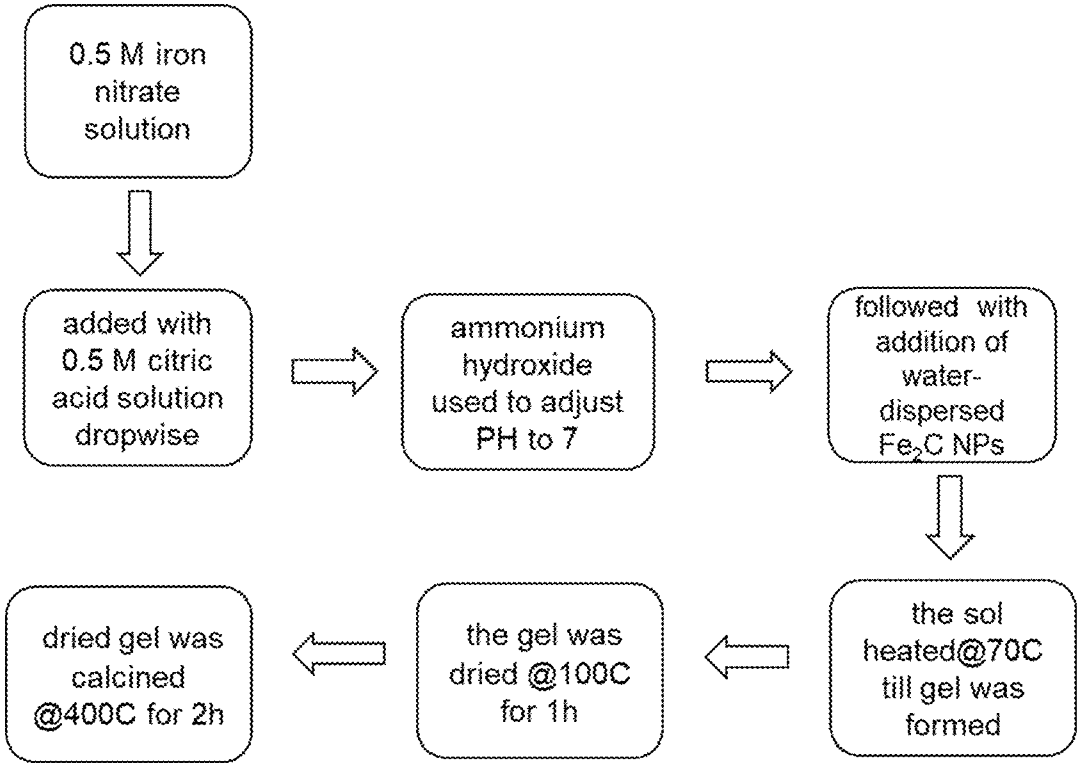
FIG. 4. Flow-chart showing preparation of $Fe_2C$@$Fe_2O_3$ matrix with sol-gel method.
Figure 6:
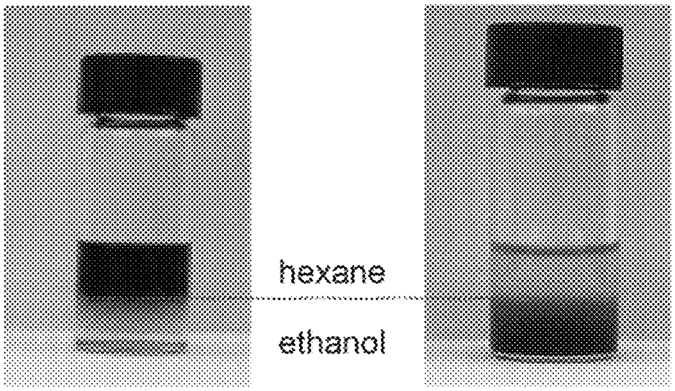
FIG. 6. Polarity inversion of $Fe_2C$ NPs. Left and right photographs show the dispersion of $Fe_2C$ NPS in hexane (top) and ethanol (bottom) before and after the treatment, respectively. While the NPs disperse well in hexane before the treatment, they are extracted into the ethanol phase after the treatment, indicating the transformation from hydrophobic to hydrophilic surfaces.
Figure 7:
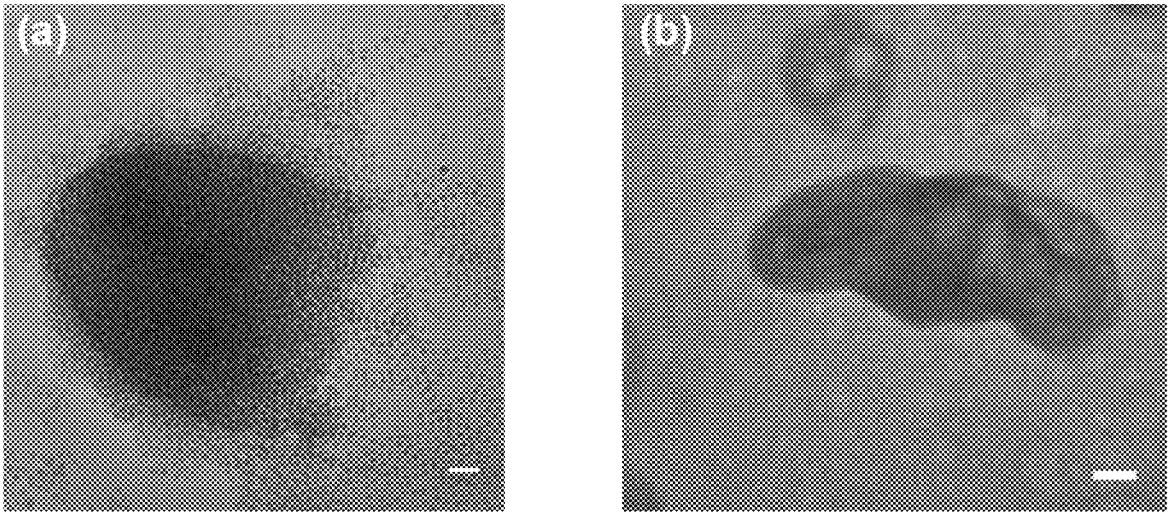
FIG. 7. TEM images of the composite precursor. (a) Without hydrophilic treatment. Scale bar, 50 nm. (b) With hydrophilic treatment of the $Fe_2C$ NPs. Scale bar, 200 nm. The as-synthesized $Fe_2C$ NPs are hydrophobic, resulting in their segregation from the hydrophilic Fe(III) oxide matrix as shown in (a). After hydrophilic treatment, the $Fe_2C$ NPs disperse well into the matrix, evident from the absence of isolated NPs in (b).

To embed $Fe_2C$ NPs uniformly in the $Fe_2O_3$ matrix, the hydrophobic NP surfaces were first transformed to hydrophilic by exchanging the surface-bound octadecanamine with citrate anion (iv). The as-synthesized $Fe_2C$ NPs was dispersed in 15 mL of 50/50 chlorobenzene:dimethylformamide solution together with 0.1 g of citric acid. The suspension was sonicated for 30 min and heated at 100° C. for 24 hrs. The NPs were precipitated by adding 40 mL ethyl ether, followed by washing in hexanes and dispersion in ethanol (FIG. 6). Then the $Fe_2C$@$Fe_2O_3$ composite was synthesized by a sol-gel process (v) using $Fe(NO_3)_3$ as precursor (FIG. 4). In a typical experiment, 0.1 M $Fe(NO_3)_3$ was added to 0.5M citric acid solution dropwise, followed by dropwise addition of 1 M ammonium hydroxide to adjust the pH to 7. The hydrophilic $Fe_2C$ NPs were dispersed in the mixture solution and heated at 70° C. till a gel forms. The gel was calcinated at 400° C. for 2 h in air. This method yields hexagonal $Fe_2C$ NPs uniformly distributed in rhombohedral $Fe_2O_3$ (hematite) with tunable $Fe_2C$:$Fe_2O_3$ ratios (FIG. 7).

Example 4. HPHT Experiments

Figure 8:
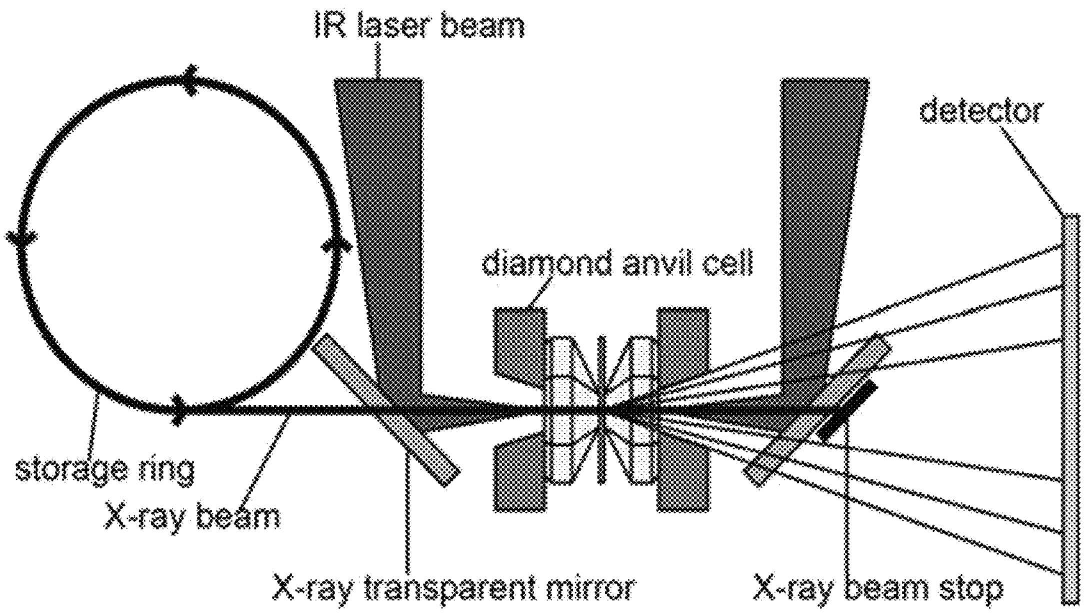
FIG. 8. Diagram showing the $Fe_2C$@$Fe_2O_3$ precursor is converted into nanodiamond by high-pressure-high-temperature (HPHT) process (Advanced Light Source. Quantum Beam Sci. 2018, 2 (1), 4). High pressure is provided by a diamond anvil cell (DAC) or a multi-anvil apparatus. High temperature is achieved through resistive or laser heating.

The HPHT experiments were conducted at beamline 12.2.2, Advanced Light Source, Lawrence Berkeley National Laboratory. The HPHT reaction (vi) is carried out in a symmetric diamond anvil cell (SymmDAC60, Almax Easylab; FIG. 8). Typical reaction pressure and temperature are 8-15 GPa and 1300-1500 K, respectively. Pressure is calibrated by the PXRD of $Fe_2O_3$. Heating is achieved using two 1064-nm lasers (redPOWER, SPI) focused on both sides of the sample, and the temperature is monitored by the black-body radiation of the sample. The high-pressure PXRD patterns are collected in situ before and after the laser heating, using 0.5-Å synchrotron radiation and a MAR345 detector.

Example 5. Ex-situ Characterizations

TEM and EDS. To prepare the TEM sample, the recovered materials from HPHT synthesis is dispersed in 50% HCl by sonication (vii). The resultant solution is drop-casted on TEM grids with 8-nm silicon nitride membranes (PELCO) and rinsed with ethanol. Lastly, the grids are dried in a $CO_2$ critical point dryer (Tousimis).

The TEM images are recorded on a Tecnai F-20 microscope with 200-kV acceleration voltage. EDS spectra are collected with an EDAX detector.

Figure 9:
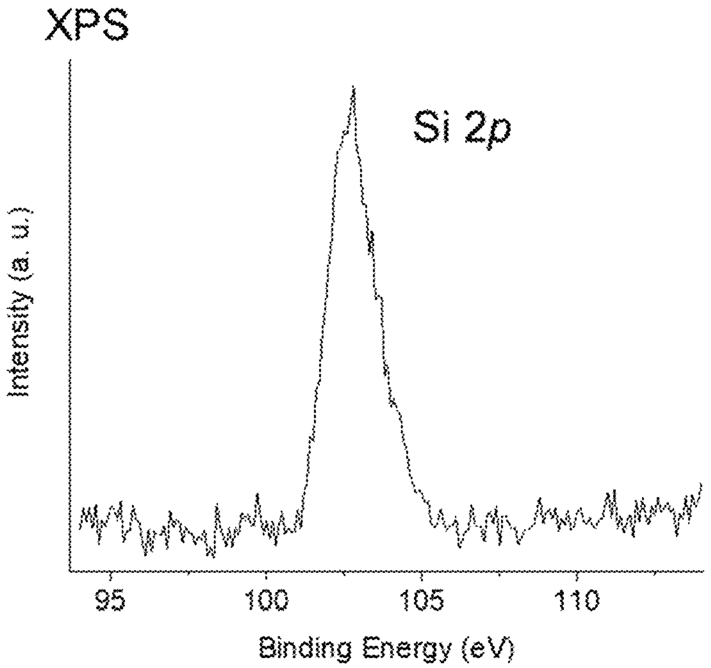
FIG. 9. Doping nanodiamond. XPS shows silicon successfully doped into nanodiamonds.

XPS. XPS data are collected on a PHI 5000 Versaprobe system using the Al $K_{\alpha}$(1.487 keV) excitation. The precursors are pressed into pellets; the products are measured inside the gasket without treatment. FIG. 9 shows nanodiamonds doped with silicon.

Example 6. Synthesis and Characterization of Fluorescent Nanodiamond

Optically active defects, known as color centers, are quintessential for the functionalities of NDs toward imaging and quantum information processing. While chemical doping of HPHT diamond has been extensively investigated, incorporation of color centers in ultra-small uniform NDs remains an outstanding challenge. It was shown that nitrogen-vacancy (N-V) color centers can be incorporated into uniform, sub-5-nm NDs, giving them fluorescent properties.

Figure 10:
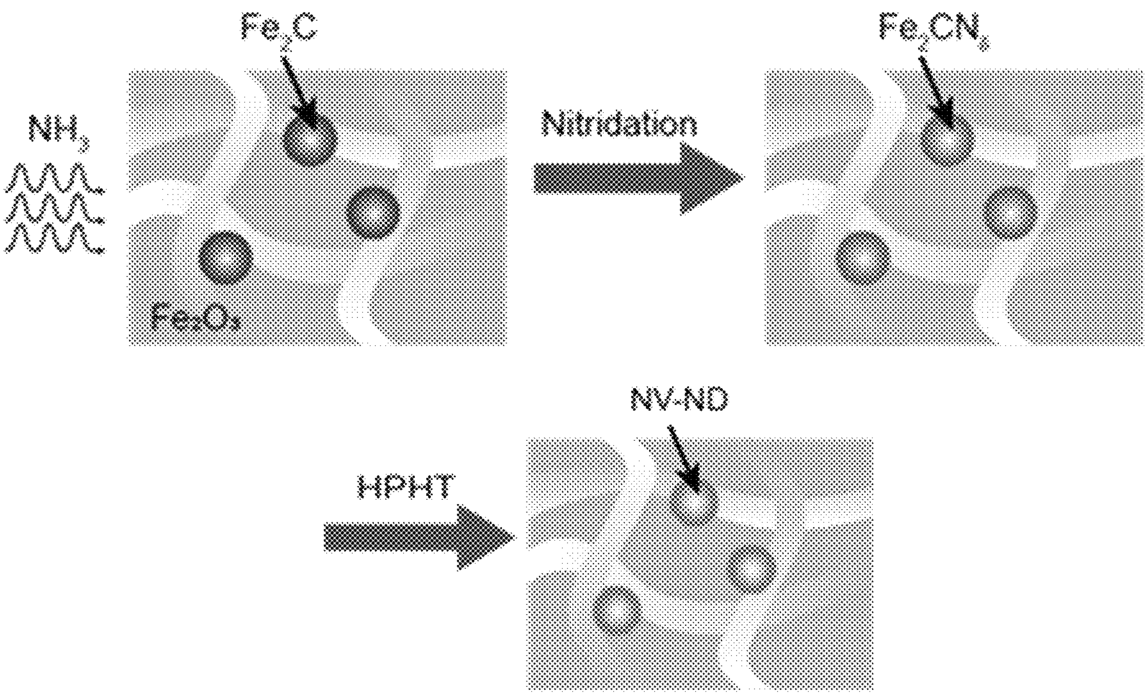
FIG. 10. Schematic showing the synthesis of NV-NDs.

Method. First, a sacrificial pore-forming material (silica colloidal particles, 20 nm in diameter, LUDOX AS-40, Sigma-Aldrich) is embedded into the $Fe_2C$—$Fe_2O_3$ gel (at step v from above). After calcination at 400° C. in air, the silica particles are removed in sodium hydroxide (1 M aqueous solution, overnight), yielding a mesoporous structure (FIG. 10). The precursor is then annealed in ammonia at 500° C. for 30 min. The precursor is then subjected to (vi) HPHT conditions (6-10 GPa, 1300-1500 K). Finally, the iron-containing byproducts are removed (vii) by acid treatment (50% HCl aqueous solution, overnight), yielding pure ND samples. The mesoscopic pores in the precursor allow ammonia to diffuse to and partially nitridate the $Fe_2C$ NPs while maintaining their monodispersity. A non-porous $Fe_2C$—$Fe_2O_3$ precursor does not give fluorescent NDs.

Figure 11:
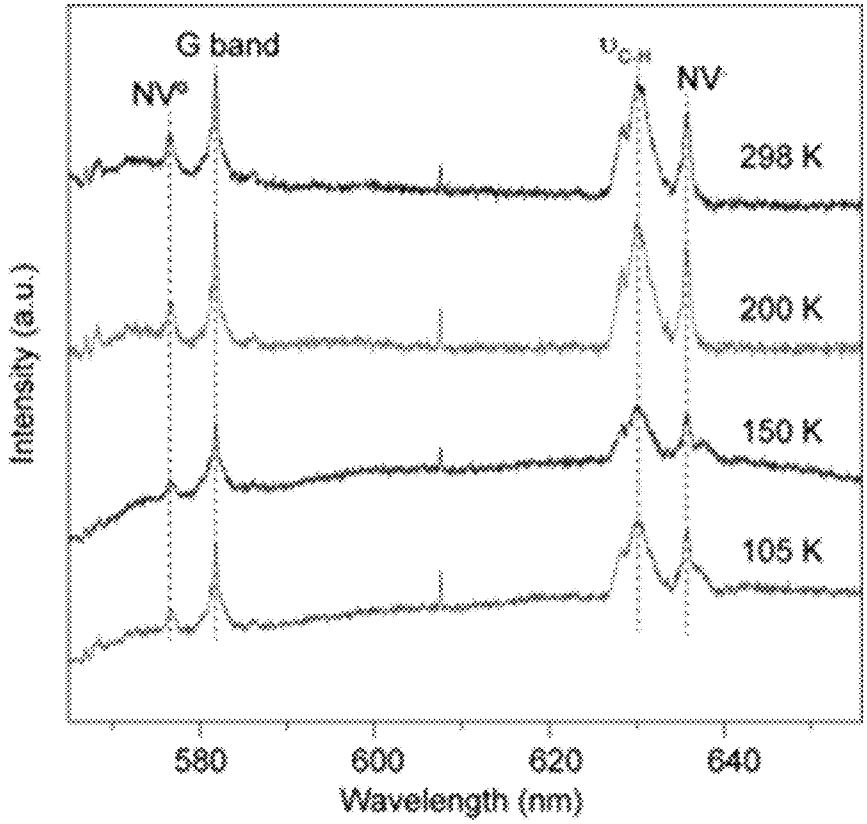
FIG. 11. Photoluminescence and Raman spectra of nitrogen-doped NDs at different temperatures. Excitation wavelength: 532 nm.

Characterization. Photoluminescence (PL) spectra taken on an ensemble of the nitrogen-doped NDs (FIG. 11) show several characteristic peaks; most notably, the peaks at 577 and 637 nm correspond to emission from neutral)($NV^0$) and negatively charged ($NV^-$) N-V centers, respectively. In addition, a double-peak feature centering at 630 nm was also observed. This feature has a consistent Raman shift of 2875-2880 $cm^{-1}$ at different excitation wavelengths, consistent with the stretching mode of C—H bonds and indicating the hydrogenation of ND surfaces. Since this Raman mode is not observed in the as-synthesized product, it was postulated that hydrogenation takes place during the acid treatment. Notably, both $NV^0$ and $NV^-$ peaks are sharp without observable side bands from 100 K up to room temperature, in clear contrast to N-V photoluminescence from detonation nanodiamonds and indicating high crystallinity of the disclosed NDs.

Figure 12:
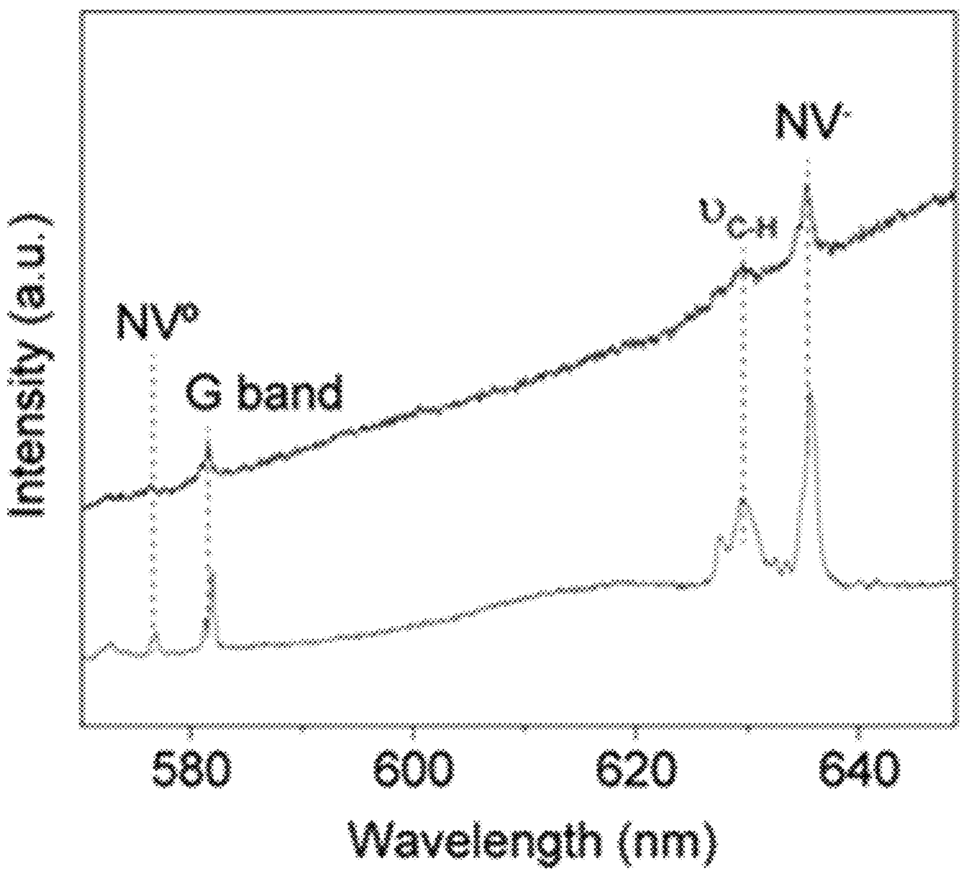
FIG. 12. PL/Raman intensity of NV NDs before (bottom trace) and after (top trace) 100° C. heating in air.

The optical and spin properties of NV centers, as well as their applications, depend sensitively on their charge states. For example, $NV^-$ is preferred over $NV^0$ for magnetometry and metrology. Emission intensities of $NV^0$ and $NV^-$ can be tuned by ND surface chemistry. Hydrogenated diamond surfaces are intrinsically unstable in air and can be oxidized under mild conditions. After heating the ND sample in air at 100° C. for 30 mins, both the $NV^0$ and $\upsilon_{C-H}$ peaks are greatly suppressed, suggesting the concurrent removal of surface C—H bonds and neutral N-V centers (FIG. 12).

Figure 13:
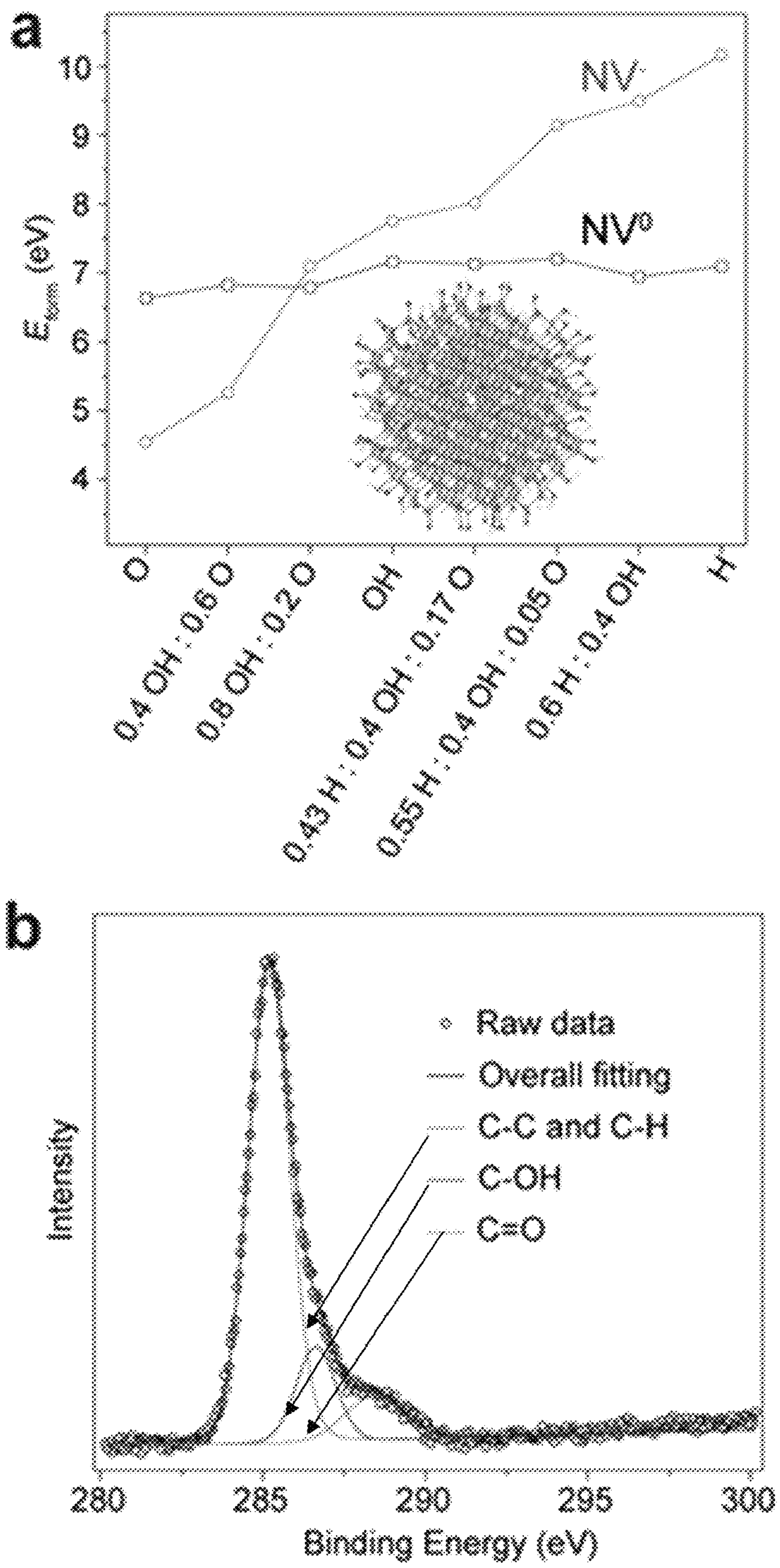
FIG. 13. (a) $E_{form}$ of a 2-nm ND with single $NV^-$ or $NV^0$ and different surface terminations. Inset, atomic model of a 2-nm ND with an N-V center and mixed H-, OH- and O-terminated surface. (b) C-1s XPS of N-doped NDs after acid treatment.

H- and OH-terminated diamond surfaces have negative electron affinity (NEA), disfavoring negative charges on the ND. It was hypothesized that surface oxidation stabilizes $NV^-$ over $NV^0$. To test this, a 2-nm ND with a single N-V center and various surface terminations at the density-functional tight-binding (DFTB) level of theory was modeled. The computed formation energy ($E_{form}$) of $NV^-$ strongly depends on the surface termination, while $E_{form}$ of $NV^0$ remains relatively unaffected (FIG. 13*a*). For H-terminated ND, $NV^0$ is more stable than $NV^-$ by over 3 eV. In a ND structure with mixed surface groups (43% H, 40% OH and 17% 0) consistent with C-1s XPS data (FIG. 13*b*), $NV^0$ and $NV^-$ have comparable $E_{form}$ within 1 eV, supporting the coexistence of both charge states. Upon further oxidation, $NV^-$ is further stabilized, becoming energetically favorable over $NV^0$ by up to 3 eV.

In conclusion, (1) a new method to synthesize sub-5-nm NDs with N-V color centers and (2) a method to tune the charge state of the color center by surface chemistry have been developed. The substantially improved optical quality of the N-V centers provides a platform for imaging, sensing, and quantum information science.

Example 7. Detailed Synthesis of Nanodiamond with Nitrogen-Vacancy (NV) Centers Synthesis of partially nitridated $Fe_2C$—$Fe_2O_3$ precursor:

i. In a typical experiment, 0.1 M $Fe(NO_3)_3$ is added to 0.5M citric acid solution dropwise, followed by dropwise addition of 1 M ammonium hydroxide to adjust the pH to 7.
ii. The hydrophilic $Fe_2C$ NPs are dispersed in the mixture solution at desired ratio ($Fe_2C$:$Fe(NO_3)_3$ molar ratio 1:1 to 1:6) and stirred for 30 minutes.
iii. 20-nm silica colloidal particles (40% aqueous suspension, LUDOX AS-40, Sigma-Aldrich) is mixed into the above solution to a volume ratio of 0.87.
iv. The solution is then heated to 80° C. under vigorous stirring and turned into a gel.
v. The gel is calcinated in air at 400° C. for 30 minutes.
vi. The product is stirred in 1 mol/L sodium hydroxide solution for 12 hrs to remove the silica particles. This produces a porous $Fe_2O_3$ structure with embedded $Fe_2C$ nanoparticles.
vii. Lastly, the porous structure is annealed in ammonia at 500° C. for 15 minutes.

Synthesis of nanodiamond with nitrogen-vacancy centers: The synthesis of NV nanodiamond is similar to that of the pristine nanodiamond. Briefly, the precursor is compressed to ~10 GPa in a diamond anvil cell or large-volume press, and heat to 1500° C. After the synthesis, the nanodiamonds are recovered by dissolving the remaining precursor and byproducts (ferrous oxide) in hydrochloric acid.

Surface chemistry modulation of nanodiamond: The surface coverage of nanodiamond affects the relative stability of NV centers with different charge states. Hydrogen coverage stabilizes neutral NV centers while oxygen coverage stabilizes negative NV centers. The surface of the NV nanodiamond after synthesis and hydrochloric acid treatment is partially covered with hydrogen atoms. To convert it to oxygen coverage, the as-synthesized NV nanodiamond is heated in air at 100° C. for 30 minutes. The oxygen in the air replaces hydrogen atoms on the nanodiamond surfaces, which subsequently stabilizes negative NV centers.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A composition comprising nanodiamond particles wherein:

a) each nanodiamond particle is encapsulated by a transition metal oxide layer comprising iron(II) oxide (FeO) encapsulated by a layer comprising iron(III) oxide ($Fe_2O_3$); and
b) each nanodiamond particle has a diameter of about 1 nm to about 5 nm;

wherein the diameters the nanodiamond particles of the composition vary by ±0.3 nm or less.

2. The composition of claim 1 wherein the diameter of the nanodiamond particles is 3.15 nm±0.23 nm.

3. The composition of claim 1 wherein the diameter of the nanodiamond particles is 2.49 nm±0.22 nm.

4. The composition of claim 1 wherein the nanodiamond particles do not comprise graphite.

5. The composition of claim 1 wherein the nanodiamond particles have no defects in their crystal lattice.

6. The composition of claim 1 wherein the nanodiamond particles are doped with a heteroatom, wherein optionally the doped nanodiamond particles further comprise carbon vacancies.

7. The composition of claim 6 wherein the nanodiamond particles comprise a nitrogen-vacancy (NV) color center wherein NV is neutral or negatively charged.

8. The composition of claim 1 wherein the diameter of the nanodiamond particles is 2.22 nm±0.22 nm.

9. The composition of claim 1 wherein the diameter of the nanodiamond particles is 2.13 nm±0.22 nm or 1.75 nm±0.18 nm.

10. A method for forming uniformly sized nanodiamond particles comprising:

a) inverting the polarity of hydrophobic iron carbide nanoparticles to hydrophilic iron carbide nanoparticles;
b) dispersing the hydrophilic nanoparticles in a pH neutral solution of iron(III) nitrate ($Fe(NO_3)_3$) to form a mixture;
c) heating the mixture to form a colloidal gel;

d) calcining the colloidal gel in the presence of oxygen to form a composite of iron carbide ($Fe_2C$) nanoparticles that are uniformly distributed in iron(III) oxide ($Fe_2O_3$); and e) applying a high pressure and high temperature (HPHT) to the composite suitable for forming uniformly sized nanodiamond particles according to claim 1.

11. The method of claim 10 wherein the composite has an $Fe_2C$:$Fe_2O_3$ molar ratio of about 1:1 to about 1:6; and/or the $Fe_2C$ nanoparticles have a diameter of about 5 nm to about 15 nm and the diameter of each of the particles varies by ±1.5 nm or less.

12. The method of claim 10 wherein inverting the polarity of the hydrophobic nanoparticles comprises exchanging an alkylamine bound to the surface of the hydrophobic nanoparticles with a citrate ion to form hydrophilic nanoparticles.

13. The method of claim 10 further comprising i) adding silica colloidal particles to the mixture; ii) removing silica from the composite with an alkaline solution to form a mesoporous composite; and iii) annealing the mesoporous composite in ammonia prior to applying HPHT; wherein the uniformly sized nanodiamond particles comprise fluorescent nitrogen vacancies.

14. The method of claim 13 further comprising hydrogenating the nanodiamond particles to form neutral nitrogen vacancies.

15. The method of claim 13 further comprising heating the nanodiamond particles in air to form negatively charged nitrogen vacancies.

16. The method of claim 10 wherein the high pressure is about 6 GPa or more, or the high temperature is about 1200 K or more.

17. The method of claim 10 wherein the applied HPHT is performed in a diamond anvil cell (DAC) at a pressure of 8 GPa to about 15 GPa and a temperature of about 1300 K to about 1500 K.

18. The method of claim 10 further comprising dissolving a layer of iron oxide that encapsulates the nanodiamond particles with an acid.

19. The method of claim 10 wherein the nanodiamond particles have a diameter of about 1 nm to about 5 nm, and the diameters of the particles vary by +0.3 nm or less.

20. A method for forming uniformly sized fluorescent nanodiamond particles comprising:

a) inverting the polarity of hydrophobic iron carbide nanoparticles comprising exchanging an alkylamine bound to the surface of the hydrophobic nanoparticles with a citrate ion to form hydrophilic nanoparticles;

b) dispersing the hydrophilic nanoparticles in a pH neutral solution of iron(III) nitrate ($Fe(NO_3)_3$) and adding silica colloidal particles to form a mixture;

c) heating the mixture to form a colloidal gel;

d) calcining the colloidal gel in the presence of oxygen to form a composite of iron carbide ($Fe_2C$) nanoparticles that are uniformly distributed in iron(III) oxide ($Fe_2O_3$), wherein the composite has an $Fe_2C$:$Fe_2O_3$ molar ratio of about 1:1 to about 1:6, and/or the $Fe_2C$ nanoparticles have a diameter of about 5 nm to about 15 nm and the diameter of each of the particles varies by +1.5 nm or less;

e) removing silica from the composite with an alkaline solution to form a mesoporous composite;

f) annealing the mesoporous composite in ammonia;

g) applying a high pressure and high temperature (HPHT) to the annealed mesoporous composite suitable to form uniformly sized fluorescent nanodiamond particles according to claim 1, wherein the uniformly sized fluorescent nanodiamond particles comprise fluorescent nitrogen vacancies; and h) optionally hydrogenating the nanodiamond particles to form neutral nitrogen vacancies and/or optionally heating the nanodiamond particles in the presence of oxygen to form negatively charged nitrogen vacancies.

* * * * *